(12) United States Patent
Tanaka

(10) Patent No.: US 6,912,029 B2
(45) Date of Patent: Jun. 28, 2005

(54) OPTICAL FILM AND POLARIZING FILM USING THE SAME, AND METHOD FOR IMPROVING VIEW ANGLE OF THE POLARIZING FILM

(75) Inventor: Kouichi Tanaka, Kita-ku (JP)

(73) Assignees: Nippon Kayaku Kabushiki Kaisha, Tokyo (JP); Polatechno Co., Ltd., Tokyo (JP)

(*) Notice: Subject to any disclaimer, the term of this patent is extended or adjusted under 35 U.S.C. 154(b) by 0 days.

(21) Appl. No.: 10/433,394
(22) PCT Filed: Dec. 17, 2001
(86) PCT No.: PCT/JP01/11029
§ 371 (c)(1), (2), (4) Date: Jul. 16, 2003
(87) PCT Pub. No.: WO02/50580
PCT Pub. Date: Jun. 27, 2002

(65) Prior Publication Data
US 2004/0066482 A1 Apr. 8, 2004

(30) Foreign Application Priority Data

| Dec. 18, 2000 | (JP) | 2000-383509 |
| Jan. 17, 2001 | (JP) | 2001-008597 |
| Jan. 29, 2001 | (JP) | 2001-020324 |

(51) Int. Cl.$^7$ ................................... G02F 1/13
(52) U.S. Cl. ........................... 349/118; 349/119
(58) Field of Search ............................... 349/118

(56) References Cited

U.S. PATENT DOCUMENTS

| 5,859,681 A | * 1/1999 | VanderPloeg et al. | 349/120 |
| 5,923,392 A | * 7/1999 | Akatsuka et al. | 349/118 |
| 6,292,242 B1 | * 9/2001 | VanderPloeg et al. | 349/118 |

FOREIGN PATENT DOCUMENTS

| EP | 1 045 261 | 10/2000 |
| JP | 11-023843 | 1/1999 |
| JP | 2000-137116 | 5/2000 |
| JP | 2000-227520 | 8/2000 |
| JP | 2001-042121 | 2/2001 |
| JP | 2001-091743 | 4/2001 |
| JP | 3204182 | 9/2001 |
| WO | 98/00475 | 1/1998 |

OTHER PUBLICATIONS

SID 98 Digest; Optimum Film Compensation Modes for TN and VA LCDs; J.Chen et al.; pp. 315–318.
Copy of the International Search Report dated Mar. 26, 2002.
Chinese Communication dated Jun. 18, 2004, together with an English translation.

* cited by examiner

Primary Examiner—James A. Dudek
(74) Attorney, Agent, or Firm—Nields & Lemack

(57) ABSTRACT

The invention provides an optical film prepared by laminating at least one of a first retardation film (2), having a mean in-plane refractive index of $n_o$ and refractive index in the thickness direction of $n_e$ wherein $n_e-n_o>0$, and at least one of a second retardation film (3) having an in-plane refractive index of $n_x$ in the direction showing the maximum refractive index, refractive index of $n_y$ in the direction perpendicular to the direction described just before, and refractive index in the thickness direction of $n_z$ wherein $n_x>n_y \geq n_z$. The light leakage occurred as the observation point is tilted from the front direction to a direction different from the direction of each absorption axis can be reduced when a plolarizing film is arranged so that the absorption axes will be perpendicular to each other.

22 Claims, 15 Drawing Sheets

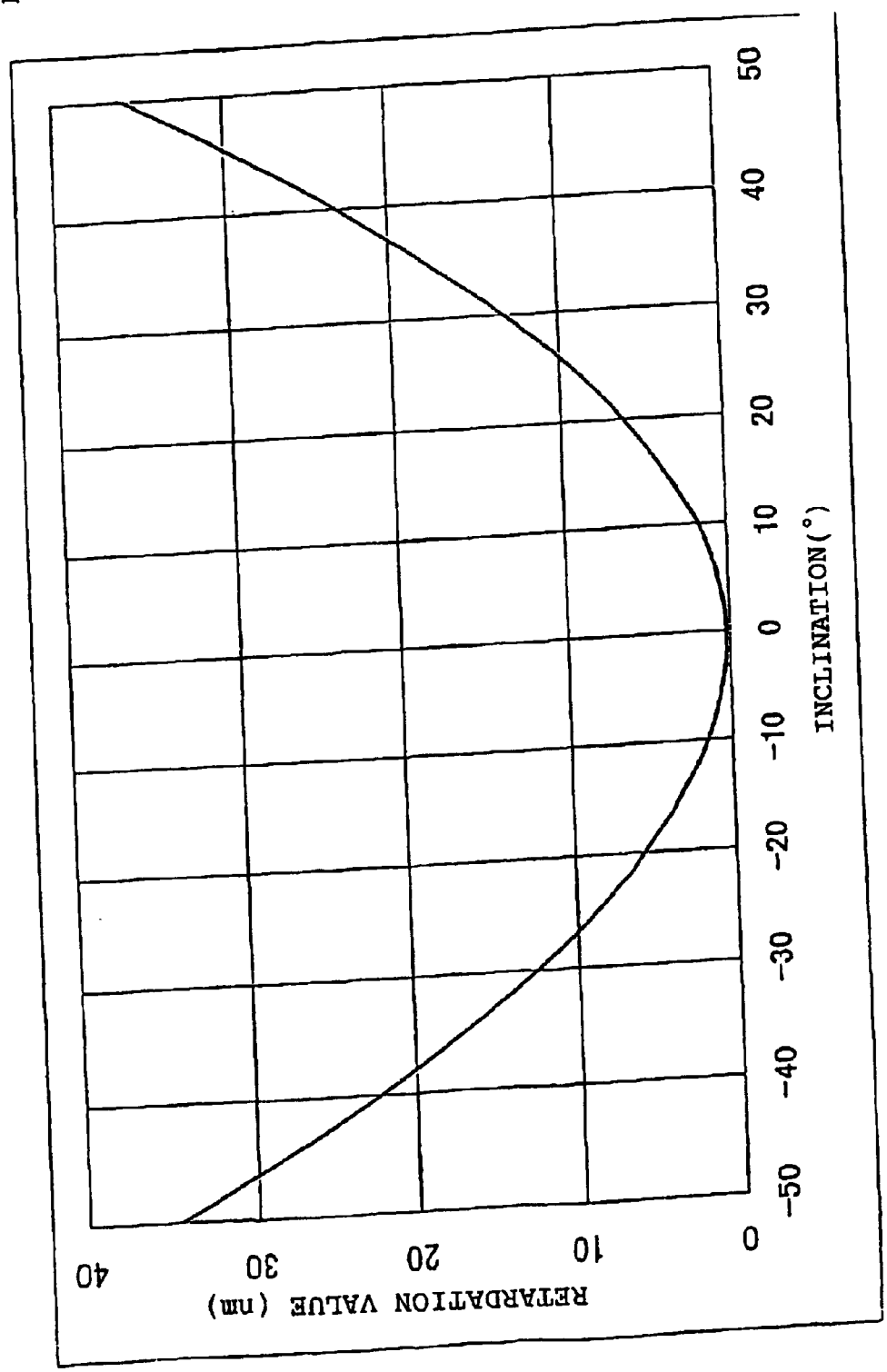

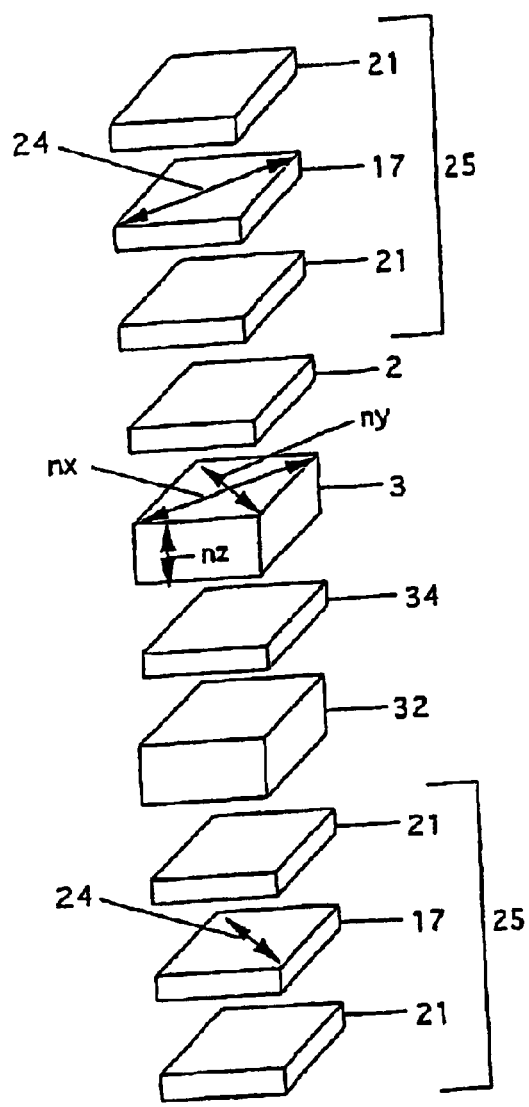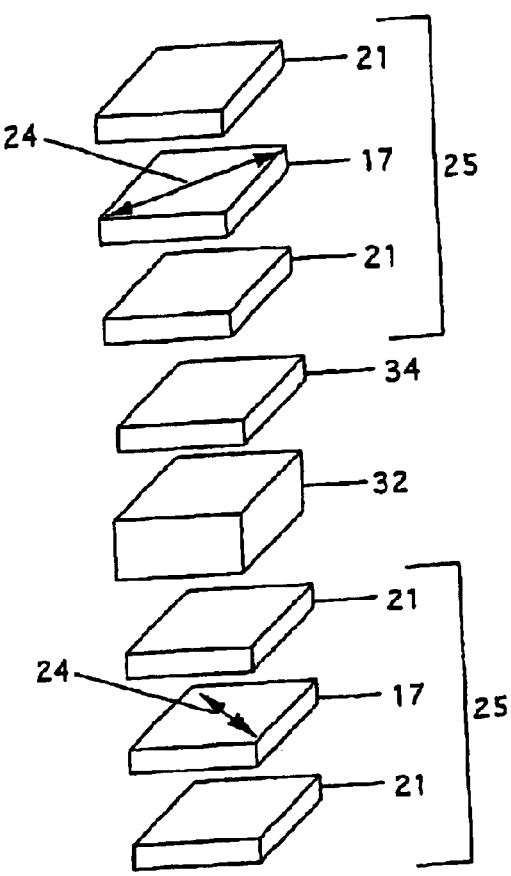

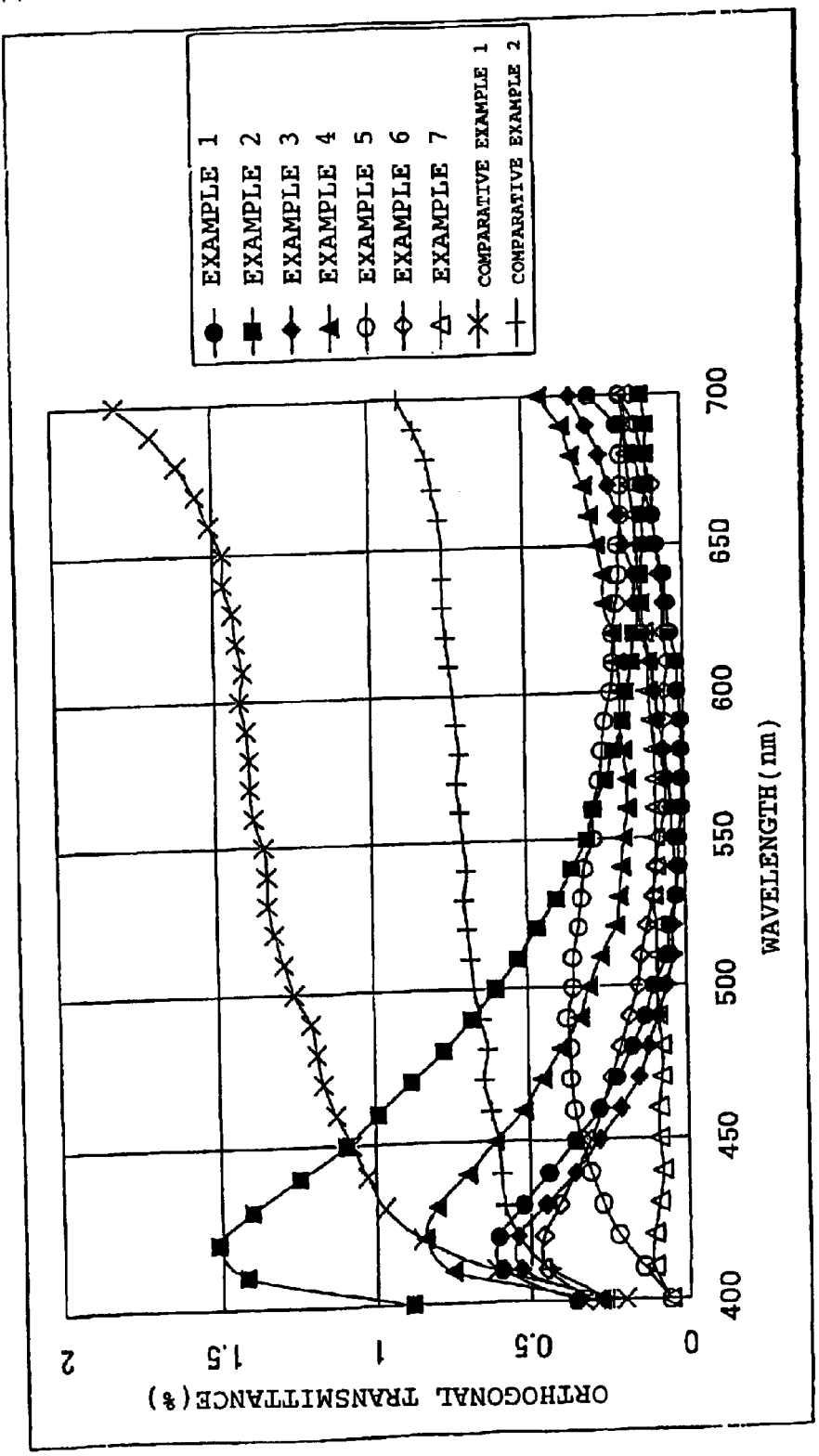

US 6,912,029 B2

OPTICAL FILM AND POLARIZING FILM USING THE SAME, AND METHOD FOR IMPROVING VIEW ANGLE OF THE POLARIZING FILM

TECHNICAL FIELD

The present invention relates to a polarizing film and retardation film to be used for a liquid crystal display device.

BACKGROUND ART

A polarizing film that is an essential optical member for a liquid crystal display device is obtained by disposing, using an adhesive, a polarizing element between protective films such as a triacetyl cellulose film whose surface layer having been treated with an alkaline. The polarizing element is obtained, for example, by uniaxially orienting a polyvinyl alcohol film impregnated with a water soluble dichromatic dye or a dichromatic pigment such as polyiodide ions in a warm aqueous boric acid solution, by forming a polyene structure by means of a dehydration reaction after uniaxially orienting a polyvinyl alcohol film.

However, when two sheets of such polarizing elements or polarizing films are disposed so that the respective absorption axis will be perpendicular to each other, there occurs a problem of the light leakage, so-called the view angle dependency of the polarizing element or polarizing film as the observation point is tilted from the front direction to a direction different from the direction of the respective axis because a polarized light passed through an incident side polarizing element or polarizing film can not be sufficiently absorbed by an emergent side polarizing film. This phenomenon has greatly affected the view angle characteristics of the liquid crystal display device using various liquid crystal cells such as the vertically aligned nematic (VA) type, in-plane switching (IPS) type and bend nematic (OCB) type.

DISCLOSURE OF INVENTION

In intensive studies for solving the above problems, the inventors have completed the present invention based on the novel founding that the light leakage generated by the tilting of the observation point from the front direction to a direction different from the respective absorption axis direction can be decreased, that the view angle dependency can be improved, and that even the wavelength dependency upon improving the view angle can be improved by means of an optical film prepared by laminating at least one first retardation film having a mean in-plane refractive index of $n_o$ and refractive index in the thickness direction of $n_e$ wherein $n_e - n_o > 0$, and at least one second retardation film having a refractive index of $n_x$ in the direction exhibiting the maximum in-plane refractive index, refractive index of $n_y$ in the direction perpendicular to the direction mentioned just before and refractive index of $n_z$ in the thickness direction wherein $n_x > n_y \geq n_z$, and by means of a polarizing film prepared by laminating the optical film and a polarizing element, provided that the above polarizing film is arranged with another polarizing element or with a polarizing film having said another polarizing element sandwiched between two protective films so that the respective absorption axis directions will be perpendicular to each other.

The present invention provides:

(1) An optical film prepared by laminating at least one a first retardation film, having a mean in-plane refractive index of $n_o$ and a refractive index of $n_e$ in the thickness direction wherein $n_e - n_o > 0$, and at least one of a second retardation film having an in-plane refractive index of $n_x$ in the direction showing a maximum refractive index, a refractive index of $n_y$ in the direction perpendicular to the direction described just before, and a refractive index of $n_z$ in the thickness direction wherein $n_x > n_y \geq n_z$;

(2) an optical film prepared by laminating at least one a first retardation film, having a mean in-plane refractive index of $n_o$ and a refractive index in the thickness direction of $n_e$ in the thickness direction wherein $n_e - n_o > 0$, and at least one of an achromatic second retardation film;

(3) the optical film according to (2), wherein the achromatic second retardation film has an in-plane refractive index of $n_x$ in the direction showing the maximum refractive index, a refractive index of $n_y$ in the direction perpendicular to the direction described just before, and a refractive index of $n_z$ in the thickness direction with the provision of $n_x > n_y \geq n_z$;

(4) the optical film according to any one of (1) to (3), wherein $\Delta n_p \cdot d_p$ is 5 to 200 nm when the thickness of the first retardation film is represented by $d_p$ provided $n_e - n_o = \Delta n_p$;

(5) the optical film according to any one of (1) to (4) wherein the first retardation film is a film comprised of a liquid crystalline compound oriented almost homeotropic to the film plane;

(6) the optical film according to (5), wherein the liquid crystalline compound is a cured material of one or a mixture of more UV-curable liquid crystalline compounds;

(7) the optical film according to any one of (1) to (6), wherein $(n_x - n_y) \cdot d$ at 550 nm is 100 to 400 nm when the thickness of the second retardation film is represented by d;

(8) the optical film according to any one of (1) to (7), wherein the second retardation film is a film comprising polycarbonate as a main component;

(9) the optical film according to any one of (2) to (7), wherein the achromatic second retardation film is a film comprising a cellulose derivative as a main component;

(10) the optical film according to (9) wherein the optical film is a film comprised of a cellulose derivative whose surface layer having been treated with an alkali;

(11) the optical film according to any one of (1) to (10), wherein the second retardation film comprised of a layer of a liquid crystalline compound having an optical axis substantially parallel to the layer plane;

(12) the optical film according to any one of (1) to (11) prepared by laminating two of the second retardation films having equal $n_x$, $n_y$ and $n_z$ with each other so that the directions showing the maximum refractive index for respective films will be perpendicular to each other;

(13) the optical film according to any one of (1) to (11) prepared by laminating two of the second retardation films having $n_x$, $n_y$ and $n_z$, at least one of them being different from the corresponding other one so that the directions showing the maximum refractive index will be perpendicular to each other;

(14) the optical film according to any one of (1) to (13) prepared by laminating at least one of a third retardation film having a mean in-plane refractive index of $n_o$ and a refractive index in the thickness direction of $n_e$ wherein $n_e - n_o < 0$;

(15) the optical film according to (14), wherein $|\Delta n_n \cdot d_n|$ is 5 to 200 nm when the thickness of the third retardation film is represented by $d_n$ with the provision of $n_e - n_o = \Delta n_n$;

(16) the optical film according to (14) or (15), wherein the third retardation film is a triacetyl cellulose film;

(17) the optical film according to (14) to (16) prepared by laminating two second retardation films so that the directions showing the maximum refractive index will be perpendicular to each other, followed by sequentially laminating the first retardation film and third retardation film;

(18) the optical film according to any one of (1) to (17), wherein the absolute value of the difference between the sum of $\Delta n_p \cdot d_p$ of the first retardation film and the sum of $|\Delta n_n \cdot d_n|$ of the third retardation film is 5 to 100 nm;

(19) an optical film comprised of an achromatic fourth retardation film having an in-plane refractive index of $n_x$ in the direction showing the maximum refractive index, a refractive index of $n_y$ in the direction perpendicular to the direction described just before, and a refractive index of $n_z$ in the thickness direction wherein of $n_x > n_y$ and $n_z > n_y$;

(20) an optical film prepared by laminating a third retardation film having a mean in-plane refractive index of $n_o$ and a refractive index of in the thickness direction $n_e$ wherein $n_e - n_o < 0$, and an achromatic fourth retardation film having an in-plane refractive index $n_x$ in the direction showing the maximum refractive index, a refractive index of $n_y$ in the direction perpendicular to the direction described just before, and a refractive index of $n_z$ in the thickness direction wherein $n_x > n_y$ and $n_z > n_y$;

(21) the optical film according to (19) or (20), wherein $\Delta na \cdot da$ of the fourth retardation film at 550 nm is 100 to 400 nm when the thickness of the film is represented by $d_a$ wherein $n_x - n_y = \Delta n_a$;

(22) a polarizing film comprising the optical film according to any one of (1) to (21) and a polarizing element;

(23) the polarizing film according to (22) prepared by laminating the second retardation film or fourth retardation film so that the direction showing the maximum refractive index either of the second retardation film or fourth retardation film to be disposed at the polarizing element (17) side will align with the direction of the absorption axis of the polarizing element;

(24) a method for improving the view angle of a polarizing element, wherein the optical film according to (1) to (21) is sandwiched between two the polarizing elements (17) disposed so that their absorption axis will be perpendicular to each other;

(25) a method for improving the view angle of a polarizing element, wherein the polarizing film according to any one of (22) and (23) is used as one of the two sheets of the polarizing element, and the absorption axis of the polarizing element is rendered perpendicular to the absorption axis of the other polarizing element;

(26) a method for improving the view angle of a polarizing element, wherein the polarizing film according to any one of (22) and (23) is used for one of the two of the polarizing element, and a polarizing film sandwiched between two of the third retardation film having a mean in-plane refractive index $n_o$ and a refractive index in the thickness direction of $n_e$ with the provision $n_e - n_o < 0$ is used for the other polarizing element, and wherein the each absorption axis (24) of the polarizing elements is rendered perpendicular to each other;

(27) the method for improving the view angle of a polarizing element according to any one of (24) to (26), wherein the absolute value of the difference between the sum of $|\Delta n_n \cdot d_n|$ of the third retardation film sandwiched between the polarizing elements and the sum of $\Delta n_p \cdot d_p$ of the first retardation film sandwiched between the polarizing elements is 5 to 100 nm;

(28) a liquid crystal display device comprising the optical film or polarizing film according to any one of (1) to (23);

(29) the liquid crystal display device according to (28), wherein a liquid crystal cell for effecting image display device is sandwiched between arbitrary films among respective films constituting the optical film according to any one of (1) to (21) disposed between the polarizing elements disposed so that the absorption axis will be perpendicular to each other;

(30) the liquid crystal display device according to (28), wherein a liquid crystal cell is sandwiched between the polarizing film sandwiched between two of the third retardation film having a mean in-plane refractive index $n_o$ and refractive index in the thickness direction of $n_e$ wherein $n_e - n_o < 0$, and the polarizing film according to any one of (22) and (23);

(31) the liquid crystal display device according to (28), wherein the liquid crystal cell is sandwiched between two of the second retardation films constituting the polarizing film according to any one of (22) and (23), and at the same time the polarizing elements are provided each side of the second retardation films opposed to the cell, those film being laminated so that the direction showing the maximum refractive index of each second retardation film will align with the direction of the absorption axis of the polarizing element at each side;

(32) the liquid crystal display device according to any one of (28) to (31) wherein the liquid crystal cell is a liquid crystal cell that has improved its own view angle dependency.

BRIEF DESCRIPTION OF THE DRAWINGS

FIG. 40 is a graph showing the change of the retardation value against the inclination of the first retardation film described in Example 1 used in the invention;

FIG. 41 shows a construction of the liquid crystal display device according to the invention described in Examples 4;

FIG. 44 shows the liquid crystal display device described in Comparative Example 3; and FIG. 45 is a graph showing transmittance against the wavelength measured in Examples and Comparative Examples of an incident light with the inclination of 50° at 45° direction from each absorption axis when the respective absorption axes are perpendicular to each other.

BEST MODE FOR CARRYING OUT THE INVENTION

The invention will be described in more detail with reference to attached drawings.

Figure 1:
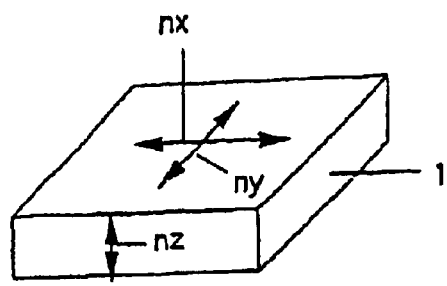
FIG. 1 shows a retardation film.

The optical film according to the invention comprises a laminate of a plurality of retardation films. In a first retardation film to be used in the invention, an in-plane mean refractive index $n_o$ determined by the following equation (1) and a refractive index $n_e$ in the thickness direction determined by the following equation (2) satisfy a relation of $n_e-n_o>0$, wherein the refractive index in the direction showing the maximum in-plane refractive index is represented by $n_x$, and the refractive index perpendicular to the above direction is represented by $n_y$ as shown in FIG. 1.

$$n_o=(n_x+n_y)/2 \tag{1}$$

$$n_e=n_z \tag{2}$$

The smaller is preferable the difference between $n_x$ and $n_y$, and they are more preferably equal with each other. Preferably, $d_p$ and $\Delta n_p$ of the film are adjusted so that $\Delta n_p \cdot d_p$ as a product thereof is adjusted so that it is preferably 5 to 200 nm, more preferably 10 to 100 nm and particularly 20 to 60 nm, wherein the thickness of the film is represented by $d_p$, and $\Delta n_p$ is defined by $n_e-n_o$. While examples of such retardation films include polycarbonate, polyethylene terephthalate, polyether sulfone, polyethylene, a cycloolefin polymer such as norbornene derivatives, or a plastic film mainly comprising triacetyl cellulose, diacetyl cellulose, polyolefin, polyethylene and polyvinyl alcohol, which are biaxially stretched in the $n_x$ and $n_y$ directions followed by stretching in the $n_z$ direction, or a film comprising a liquid crystalline compound homeotropically aligned to the film plane. However, it is particularly preferable to use the film comprising the liquid crystalline compound homeotropically aligned the film plane, since $n_x$ and $n_y$ becomes substantially equal with each other.

Examples of the liquid crystalline compound that is homeotropically aligned perpendicular to the plane of the film to be used for the first retardation film of the invention include a thermotropic liquid crystalline compound that exhibits crystallinity in a certain temperature range, and a lyotropic liquid crystalline compound that exhibits a liquid crystalline property in a particular concentration range. A plurality of liquid crystalline compounds are mixed in order to permit the thermotropic liquid crystalline compound to exhibit crystallinity in a wide temperature range. The liquid crystalline compounds may be a low molecular weight compound, a high molecular weight compound or a mixture thereof. These liquid crystalline compounds are preferably polymerized or cross-linked by UV light or heat in order to fix the oriented state. The liquid crystalline compound preferably has polymerizable groups such as (meth)acryloyl, epoxy and vinyl groups, or has cross-linkable functional groups such as amino and hydroxyl groups. Examples of such compounds are described in WO 97/44703 and WO 98/00475. These compounds include a liquid crystalline compound that is horizontally oriented (in-plane orientation) with a slightly tilted angle at the alignment layer side when the layer of the compound is formed on a substrate subjected to a rubbing treatment such as a conventional polyimide alignment layer that is used for producing a twisted nematic (TN) liquid crystal cell, and is almost homeotropically aligned at the air interface side (homeotropic liquid crystalline compound); or a liquid crystalline compound that is homeotropically aligned when the layer of the compound is formed on a substrate that allows the compound to be almost homeotropically aligned, or on a glass substrate. A film comprising a liquid crystalline compound that is readily homeotropically aligned to the film plane can be obtained by using such liquid crystalline compound and by using an alignment layer that allows the compound to be homeotropically aligned to the film plane. When these compounds are polymerized or cross-linked by UV light or heat in the presence of a polymerization initiator or a cross linking agent while maintaining the alignment state, optical anisotropic film obtained can retain their alignment states against temperature changes thereafter.

The method for allowing the liquid crystalline compound to be homeotropically aligned to the film plane comprises forming an alignment layer that allows the liquid crystalline compound to be homeotropically aligned to a substrate film, and forming a layer of the liquid crystalline compound on the surface of the alignment layer. Examples of the alignment layer that permits homeotropic alignment include a polyimide film having side chains such as long chain alkyl groups; a film obtained by cross-linkable of an acrylic polymer, which is obtained by copolymerization of a long chain alkyl(meth)acrylate such as n-butyl(meth)acrylate and n-hexyl(meth)acrylate with acrylic acid or a (meth)acrylate having a functional group such as 2-hydroxyethyl (meth) acrylate, with a cross-linkable agent such as toluene diisocyanate and 1,6-hexane diisocyanate; a uniaxially stretched polyvinyl alcohol film treated with boric acid; and a polyvinyl alcohol film formed on a substrate film and treated with boric acid. These films are subjected to a rubbing treatment.

While the layer of the liquid crystalline compound may be formed by directly applying the compound on the alignment layer when the compound itself is able to be applied alone for forming the layer of the liquid crystalline compound on the alignment layer, it is also possible to apply the compound as a solution. The solvents for the application solution of the compound is not particularly restricted, so long as the solution has good wettability in applying on the alignment layer, and orientation of the liquid crystal layer is not disturbed after drying. While examples of the solvent include aromatic hydrocarbons such as toluene and xylene; ethers such as anisole, dioxane and tetrahydrofuran; ketones such as methylisopropyl ketone, methylethyl ketone, cyclohexanone, cyclopentanone, 2-pentanone, 3-pentanone, 2-hexanone, 3-hexanone, 2-heptanone, 3-heptanone, 4-heptanone and 2,6-dimethyl-4-heptanonre; alcohols such as n-butanol, 2-butanol, cyclohexanol and isopropyl alcohol; cellosolves such as methyl cellosolve and methyl cellosolve acetate; and esters such as ethyl acetate, butyl acetate and methyl lactate, the solvents are not restricted thereto. The solvents may be used alone, or as a mixture thereof. While the concentration for dissolving the liquid crystalline compounds differs depending on the solubilizing power of the solvent, wettability of the solvent on the substrate film and thickness after application, it is preferably 5 to 80% by weight, more preferably 10 to 70% by weight. It is also possible to add various leveling agents in order to enhance wettability on the substrate film comprising the homeotropic alignment layer and uniformity of the application thickness. Any leveling agents are available so long as alignment of the liquid crystal is not disturbed.

While the method for coating the liquid crystalline compound on the alignment layer is not particularly restricted, the compound is preferably applied as uniform as possible since the thickness of the liquid crystal layer after application affects the value of $\Delta n_p \cdot d_p$. Examples of the application method include a micro-photogravure coating method, photogravure coating method, wire-bar coating method, dip coating method, spray coating method and meniscus coating method. While the thickness of the layer of the liquid crystalline compound differs depending on the desired $\Delta n_p \cdot d_p$ value as well as on the $\Delta n_p$ value of the oriented liquid crystalline compound, it is preferably 0.05 to 20 $\mu$m, more preferably 0.1 to 10 $\mu$m.

The layer of the liquid crystalline compound is formed, for example, by the steps of: applying a solution of the liquid crystalline compound (a polymerization initiator or cross-linkable agent, and a leveling agent are added, if necessary) prepared by considering solubility and wettability on a substrate film having an alignment layer that permits homeotropic alignment to the film plane; allowing the liquid crystalline compound to be homeotropically aligned by heat drying; and fixing the oriented layer by UV light or heat polymerization or cross-linkable, if necessary. The conditions for drying by heating, and the conditions for polymerization or cross-linkable by UV light or heat are appropriately determined considering the kind of the solvent used, and temperature dependent changes and stability of alignment of the liquid crystalline compound. The layer of the liquid crystalline compound formed as described above may be bonded to a second retardation film using a pressure sensitive adhesion (PSA) after peeling the layer, or the first retardation film may be used by being directly formed on the second retardation film having an alignment layer as it is, as long as the substrate film does not compromise the characteristics of the optical film as in the case where it is, for example, the second retardation film according to the invention.

The second retardation film to be used in the invention has a refractive index $n_x$ in the direction showing the maximum refractive index in the film plane, a refractive index $n_y$ in the direction perpendicular to the direction described just before, and a refractive index $n_z$ in the thickness direction wherein $n_x > n_y \geqq n_z$ as shown in FIG. 1. When the thickness of the second retardation film is represented by d, the value of $(n_x - n_y) \cdot d$ at 550 nm is preferably 100 to 700 nm, more preferably 100 to 300 nm, and particularly 100 to 200 nm. Examples of such retardation film include a retardation film comprising polycarbonate, polyethylene terephthalate, polyether sulfone, and a cycloolefin polymer such as norbornene derivatives, a plastic film mainly comprising triacetyl cellulose, diacetyl cellulose, polyolefin, polyethylene or polyvinyl alcohol prepared by uniaxially stretching, and a film comprising a layer of a liquid crystalline compound horizontally oriented to the film plane. The film mainly comprising polycarbonate is possibly used because it is excellent in durability such as moisture and heat resistance, and is readily available since it is widely used as an optical compensation film of super-twisted nematic (STN) liquid crystal displays. The film mainly comprising polyvinyl alcohol is preferable since it is possible to allow the liquid crystalline compound to be homeotropically aligned by treating with boric acid while being able to directly use as the optical film of the invention. A film having a substantially parallel optical axis in the layer plane and comprising a layer of the liquid crystal compound aligned in parallel to the film plane may be obtained by: applying an alignment treatment by a rubbing treatment using the third retardation film to be described hereinafter as a substrate film; coating a solution of the liquid crystalline compound on the plane after applying the orientation treatment; forming a layer of the liquid crystalline compound by heat drying; and fixing the alignment while the liquid crystalline compound is horizontally aligned to the film plane. Such treatment is preferable for producing an integrated film of the third retardation film and second retardation film without bonding the third retardation film and second retardation film with a PSA or an adhesive, and for simplifying the manufacturing process by reducing the thickness of the optical film of the invention. The liquid crystalline compound may be a low molecular weight compound, a high molecular weight compound or a mixture thereof, and the compound may be polymerized or cross-linked by UV light or heat for fixing the oriented state. Examples of such compounds preferably include a compound having polymerizable groups such as (meth)acryloyl groups, epoxy groups and vinyl groups, or a compound having cross-linkable functional groups such as amino groups and hydroxyl groups, and are disclosed in Japanese Patent Application Laying Open No. 2000-98133.

Figure 2:
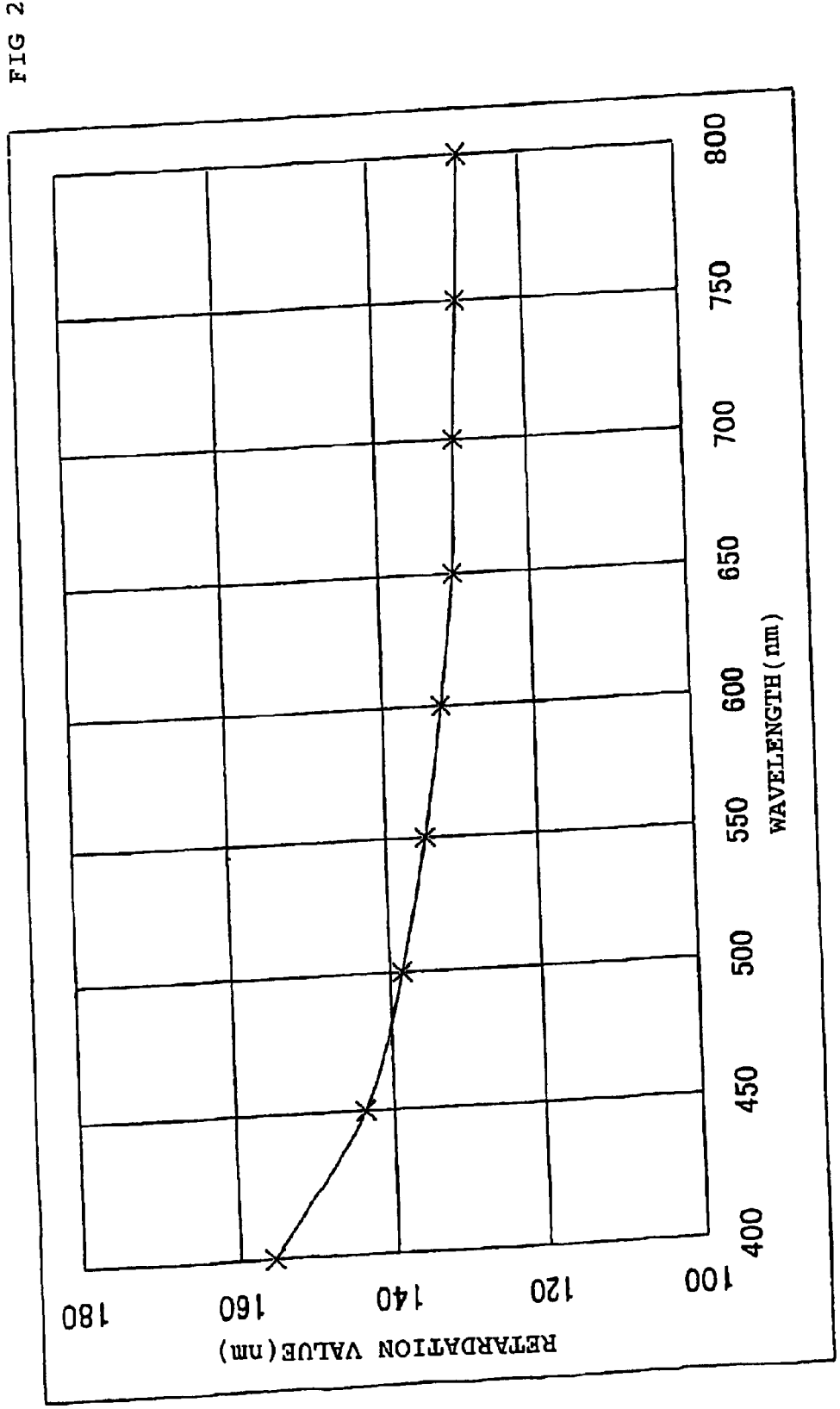
FIG. 2 is a graph showing the change of the retardation value of conventional polycarbonate retardation film depending on the wavelength.
Figure 3:
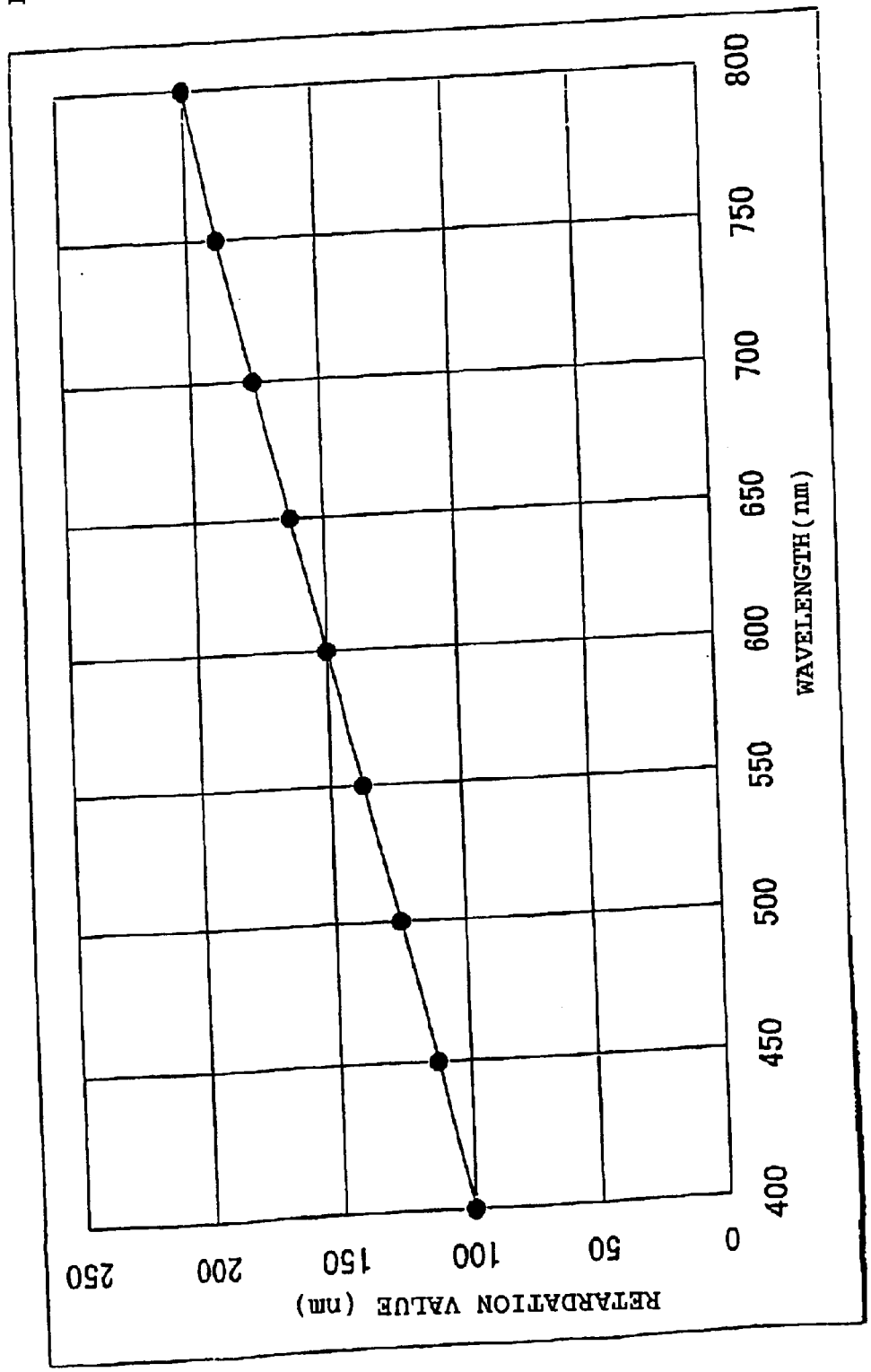
FIG. 3 is a graph showing the change of the retardation value of an ideal achromatic retardation film depending on the wavelength.

The second retardation film to be used in the invention may be an achromatic retardation film having a refractive index $n_x$ in the direction showing an in-plane maximum refractive index, a refractive index $n_y$ in the direction perpendicular to the direction described just before, and a refractive index $n_z$ in the thickness direction wherein $n_x > n_y \geq n_z$. The term "achromatic" means that the retardation has a small wavelength dependency. As shown in FIG. 2, the retardation at a wavelength shorter than 550 nm becomes larger than ¼ wavelength at the short wavelength side, while the retardation becomes smaller than ¼ wavelength at a given wavelength at the longer wavelength side, when the retardation film gives a retardation of about ¼ wavelength at 550 nm in the front direction of a conventional polycarbonate film. In contrast, the retardation becomes ¼ wavelength at an arbitrary wavelength at both wavelength side shorter than and longer than 550 nm as shown in FIG. 3 in an ideal achromatic retardation film, when the film gives a retardation of ¼ wavelength at 550 nm in the front direction of the film. When the retardation of the achromatic retardation film to be used in the invention is represented by $n_x - n_y = \Delta n$ and the thickness of the film is represented by d, the value of $\Delta n \cdot d$ is 100 to 400 nm, preferably 120 to 150 nm and 240 to 300 nm at 550 nm in the front direction of the film. The difference between the retardation obtained in the ideal achromatic film (for example, a retardation film that gives a retardation of 100 nm at 400 nm, a retardation of 137.5 nm at 550 nm, and a retardation of 200 nm at 800 nm when the retardation is ¼ of the wavelength) and the actually obtained retardation at a given wavelength is preferably −50 to 50 nm, more preferably −30 to 30 nm, at a wavelength shorter than 550 nm, and preferably −80 to 80 nm, more preferably −60 to 60 nm, at a wavelength longer than 55 nm. It is preferable to use such achromatic retardation film in order to reduce wavelength dependency of the view angle improving effect of the polarizing film obtained in the invention.

The achromatic retardation film according to the invention may be obtained by uniaxially stretching a substance having achromatic characteristics. An example of such substance is cellulose derivatives described in Japanese Patent Application Laying Open No. 2000-137116. The surface of a film made of a cellulose derivative is treated with an alkali, and a polarizing element is preferably sandwiched between the cellulose derivatives together with other protective films using a polyvinyl alcohol adhesive such as an aqueous polyvinyl alcohol solution in order to allow the polyester derivative film to also function as a protective film of the polarizing element. The polarizing element is obtained by uniaxially orienting a polyvinyl alcohol film impregnated with a dichromatic pigment such as a water soluble dichromatic dye or polyiodide ions in a warm aqueous boric acid solution. The film may be uniaxially oriented by uniaxial in-plane stretching of the film comprising the substances as described above.

Figure 4:
FIG. 4 shows an embodiment of the optical film of the inclination.
Figure 5:
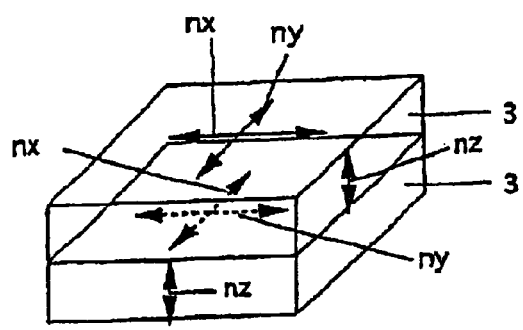
FIG. 5 shows an embodiment of lamination of the second retardation film to be used for the optical film according to the invention.
Figure 6:
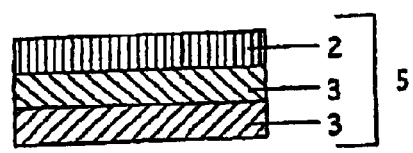
FIG. 6 shows another embodiment of the optical film according to the invention.
Figure 7:
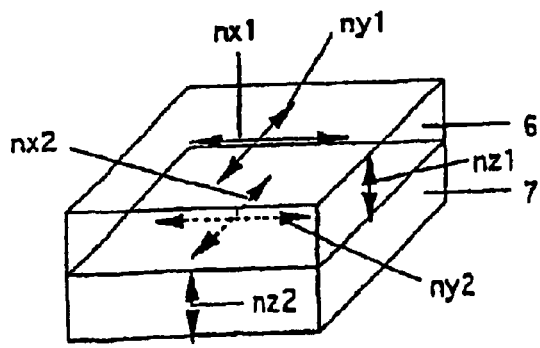
FIG. 7 shows another embodiment of lamination of the second retardation film to be used for the optical film according to the invention.
Figure 8:
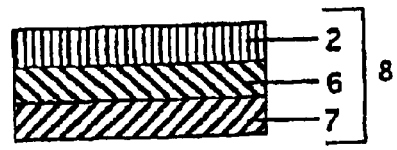
FIG. 8 shows a different embodiment of the optical film according to the invention.

The optical film of the invention is obtained by laminating at least one of the first retardation film and at least one of the second retardation film. FIG. 4 shows the optical film 4 of the invention obtained by laminating the first retardation film 2 and second retardation film 3. The retardation films may be laminated using a PSA or an adhesive, or the first retardation film may be directly laminated on the second retardation film with interposition of an alingment layer. When $n_x$ and $n_y$ of the first retardation film is not equal with each other, the films are preferably laminated so that the $n_x$ direction of the first retardation film aligns with the $n_x$ or $n_y$ direction. Otherwise, the optical film of the invention 5 is obtained using two of the second retardation films 3 having equal $n_x$, $n_y$ and $n_z$ with each other by laminating these films so that the $n_x$ directions of the two films align with each other as shown in FIG. 5, and the first retardation film 2 is laminated thereon as shown in FIG. 6. This arrangement is more preferable for reducing wavelength dependency of the view angle improving effect of the polarizing film obtained in the invention. It is preferable in this case to laminate the retardation films so that the $n_x$ direction of the first retardation film aligns with the $n_x$ direction or $n_y$ direction of the second retardation film 3, when $n_x$ is not equal to $n_y$ in the first retardation film 2. At least one of $n_x$, $n_y$ and $n_z$ may be different from the others between the two of the second retardation films, when two of the second retardation film are use. In such example, the retardation film 6 having a refractive index $n_{x1}$ in the direction showing an in-plane maximum refractive index, a refractive index $n_{y1}$ in the direction perpendicular to the direction described just before, and a refractive index $n_{z1}$ in the thickness direction wherein $n_{x1} > n_{y1} \geq n_{z1}$, and the retardation film 7 having a refractive index $n_{x2}$ in the direction showing an in-plane maximum refractive index, a refractive index $n_{y2}$ in the direction perpendicular to the direction described just before, and a refractive index $n_{z2}$ in the thickness direction wherein $n_{x2} > n_{y2} \geq n_{z2}$ are laminated so that the directions of $n_{x1}$ and $n_{x2}$ are perpendicular to each other as shown in FIG. 7, and the first retardation film 2 is laminated thereon to obtain the optical film 8 of the invention as shown in FIG. 8. It is more preferable in this case to laminate the retardation films so that the $n_x$ direction of the first retardation film aligns with the $n_{x1}$ direction or $n_{y1}$ direction of the second retardation film, when $n_x$ and $n_y$ of the first retardation film are not equal with each other.

It is also possible in the optical film of the invention to use at least one of the third retardation film in addition to the first retardation film and second retardation film. In the third retardation film to be used in the invention, the in-plane mean refractive index $n_o$ determined by the equation (1), and the refractive index $n_e$ in the thickness direction determined by the equation (2) satisfy the relation of $n_e-n_o<0$. It is preferable that the difference between $n_x$ and $n_y$ is smaller. Preferably, $d_n$ and $\Delta n_n$ are adjusted so that the absolute value $|\Delta n_n \cdot d_n|$ as a product of $\Delta n_n$ and $d_n$ is preferably 5 to 200 nm, more preferably 10 to 150 nm and particularly 10 to 100 nm, when the thickness of the film is represented by $d_n$ and the difference $n_e-n_o$ is represented by $\Delta n_n$. Examples of such retardation film include retardation films obtained by biaxially stretching a triacetyl cellulose film, polycarbonate film, polyethylene terephthalate film, polyether sulfone film, cycloolefin polymer such as norbornene derivatives, or a plastic film mainly comprising polyolefin, polyethylene and polyvinyl alcohol in the $n_x$ and $n_y$ directions, and retardation films comprising an aligned cholesteric liquid crystal. However, the triacetyl cellulose film is particularly preferable for allowing it to serve as both the protective film of the polarizing film and the third retardation film to be used in the invention by using it as an integrated film of the optical film and polarizing film, because the triacetyl cellulose film is excellent in transparency while being widely used as the protective film of the polarizing element.

Figure 9:
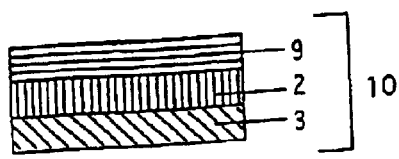
FIG. 9 shows a further different embodiment of the optical film according to the invention.
Figure 10:
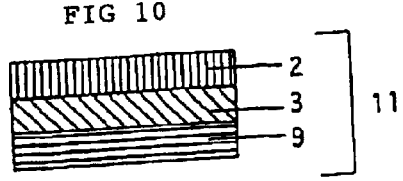
FIG. 10 shows a further different embodiment of the optical film according to the invention.
Figure 11:
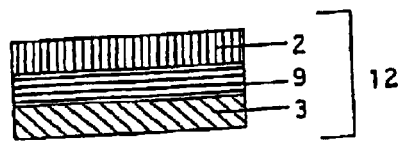
FIG. 11 shows a further different embodiment of the optical film according to the invention.
Figure 12:
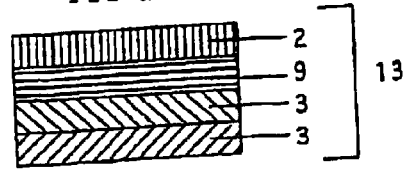
FIG. 12 shows a further different embodiment of the optical film according to the invention.
Figure 13:
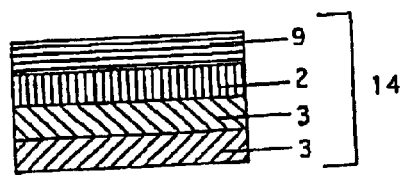
FIG. 13 shows a further different embodiment of the optical film according to the invention.

Examples of the optical film having the third retardation film of the invention include an optical film 10 obtained by laminating the first retardation film 2 laminated on the second retardation film 3 with additionally laminated third retardation film 9 as shown in FIG. 9, and the optical films 11 and 12 in which the order of lamination is changed as shown in FIGS. 10 and 11. Other examples include an optical film 13 of the invention obtained by laminating the third retardation film 9 on two of the second retardation films 3 laminated so that the nx directions of the films are aligned with each other as shown in FIG. 12, followed by laminating the first retardation film 2 thereon. It is also possible to obtain an optical film 14 of the invention by inverting the order of lamination of the first retardation film 2 and second retardation film 9 as shown in FIG. 13. In particular, using the third retardation film 9 as a film that also serves as the protective film of the polarizing element as shown in FIG. 13 is preferable, since the polarizing element can be directly sandwiched with the other protective film at the third retardation film 9 side. The retardation films to be used in the invention may be laminated using a PSA or an adhesive, if necessary. Preferably, the first retardation film 2 and third and first retardation film 9 are laminated so that the nx directions of the former aligns with the $n_x$ or $n_y$ direction of the latter, when $n_x$ and $n_y$ in the first retardation film 2 and in the third contrast film 9 are not equal with each other.

Desirably, $\Delta n_p \cdot d_p$ and $|\Delta nn \cdot dn|$ of each film is adjusted so that the absolute value $|(\Sigma \Delta np \cdot dp - \tau |\Delta nn \cdot dp|)|$ of the difference between the sum $\Sigma np \cdot dp$ of $\Delta np \cdot dp$ of each first retardation film constituting the optical film of the invention and the sum $\Sigma |\Delta nn \cdot dn|$ of $|\Delta nn \cdot dn|$ of the third retardation film constituting the optical film of the invention is 5 to 100 nm, preferably 5 to 70 nm, in order to more evidently exhibit the view angle improving effect attained in the invention.

The fourth retardation film to be used in the invention has achromatic characteristics as well as an in-plane refractive index $n_x$ in the direction showing the maximum refractive index, a refractive index $n_y$ in the direction perpendicular to the direction described just before, and a refractive index $n_z$ in the thickness direction with relations of $n_x>n_y$ and $n_z>n_y$. The retardation $\Delta n_a \cdot d_a$ of the fourth retardation film to be used in the invention is 100 to 400 nm, preferably 120 to 150 nm and 240 to 300 nm at 550 nm, in the front direction of the film, when $\Delta n_a$ is represented by $\Delta n_a = n_x - n_y$ and the thickness of the film is represented by $d_a$. The difference between the retardation obtained in the ideal achromatic film as shown in FIG. 3 (for example, a retardation film that gives a retardation of 100 nm at 400 nm, a retardation of 137.5 nm at 550 nm, and a retardation of 200 nm at 800 nm when the retardation is ¼ wavelength) and the actually obtained retardation at a given wavelength is preferably −50 to 50 nm, more preferably −30 to 30 nm, at a wavelength shorter than 550 nm, and preferably −80 to 80 nm, more preferably −60 to 60 nm, at a wavelength longer than 55 nm.

The fourth retardation film to be used in the invention is obtained, for example, by stretching a substance having achromatic characteristics in both directions of the in-plane direction and the thickness direction. Examples of such substance include cellulose derivatives disclosed in Japanese Patent Application Laying Open Nos. 2000-137116 and 2000-91743, and copolymer compositions comprising norbornene chains and styrene chains described in Japanese Patent Application Laying Open No. 2001-135622. The film made of the cellulose derivative is particularly preferable since it also functions as a protective film of a polarizing element by sandwiching the polarizing element between the cellulose film and another protective film using a polyvinyl alcohol adhesive such as an aqueous solution of polyvinyl alcohol after treating the surface layer of the polyvinyl alcohol film with an alkali. The polarizing element is obtained by uniaxially stretching the polyvinyl alcohol film impregnated with a dichromatic pigment such as a water soluble dichromatic dye or polyiodide ions in a warm aqueous boric acid solution. The film can be biaxially oriented by stretching the both surfaces of the film comprising the substances above in the thickness direction using a sticky roll after uniaxially stretching in an in-plane direction; uniaxially stretching the film in the in-plane direction followed by allowing the film to orient in the thickness direction by appropriately contracting the film in the direction opposed to the stretching direction; and allowing the film to orient in the thickness direction by applying an electric field or a magnetic field in the thickness direction after uniaxial stretching in the in-plane direction. Desirably, the degree of orientation in the $n_x$, $n_y$ and $n_z$ directions is controlled so that the $N_z$ coefficient represented by the following equation (3) is preferably 0.3 to 1, more preferably 0.5 to 0.8:

$$N_z=(n_x-n_z)/(n_x-n_y) \tag{3}$$

Figure 14:
FIG. 14 shows a further different embodiment of the optical film according to the invention.

The optical film of the invention may be produced using the fourth retardation film, or by laminating the fourth retardation film with the third retardation film. FIG. 14 shows an optical film 16 of the invention obtained by laminating the fourth retardation film 15 and third retardation film 9.

Figure 15:
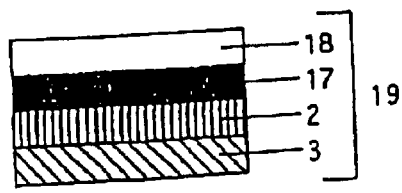
FIG. 15 shows an embodiment of the polarizing film according to the invention.
Figure 16:
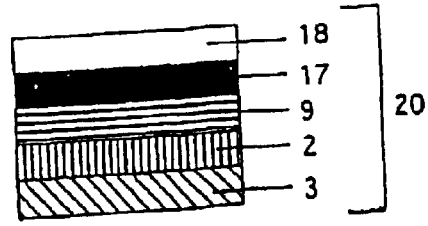
FIG. 16 shows another embodiment of the polarizing film according to the invention.
Figure 17:
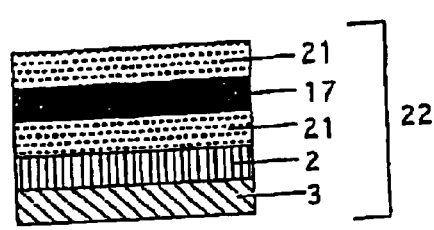
FIG. 17 shows a different embodiment of the polarizing film according to the invention.
Figure 18:
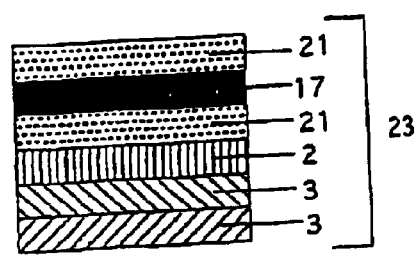
FIG. 18 shows a further different embodiment of the polarizing film according to the invention.

The polarizing film of the invention can be obtained by integrating the optical film produced as described above with the polarizing film. For example, the polarizing element can be obtained by uniaxially orienting a polyvinyl alcohol film impregnated with a dichromatic pigment such as a dichromatic dye or polyiodate ions in a warm aqueous boric acid solution, or by uniaxially stretching the polyvinyl alcohol film followed by forming a polyene structure by a dehydration reaction. Examples of the polarizing film of the invention include the polarizing film 19 comprising the first retardation film 2, second retardation film 3, polarizing element 17 and protective film 18 as shown in FIG. 15; and the polarizing film 20 comprising the first retardation film 2, second retardation film 3, third retardation film 9, polarizing element 17 and protective film 18 as shown in FIG. 16. The protective film is preferably excellent in transparency and adhesive property to the polarizing element while having an appropriate strength, and examples of them include a triacetyl cellulose film and a film mainly comprising a cycloolefin polymer such as norbornene derivatives. A function as a protective film may be obtained by forming a resin layer having no optical anisotropy such as an acrylic resin layer. The triacetyl cellulose film is particularly preferable, since it is favorably used as a protective film of the polarizing element comprising the polyvinyl alcohol film while having the function of the third retardation film to be used in the invention. The surface of the triacetyl cellulose film is recommended to be treated with an alkali before use, since the adhesive property to the polarizing element made of the polyvinyl alcohol film is improved by using an adhesive comprising an aqueous solution of polyvinyl alcohol for sandwiching the polarizing element when the surface of the triacetyl cellulose film is treated with an alkali. FIG. 17 shows an example of the polarizing film 22 of the invention comprising the second retardation film 3, first retardation film 2, and the polarizing element 17 interposed between the triacetyl cellulose films 21 as the third retardation films having the surface layers treated with an alkali. FIG. 18 shows another example of the polarizing film 23 of the invention comprising two of the second retardation films 3 having the nx directions perpendicular to each other, first retardation film 2, and the polarizing element 17 interposed between the triacetyl cellulose films 21 as the third retardation films having the surface layers treated with an alkali. It is possible to bond the polarizing element comprising the polyvinyl alcohol film and protective film using water, when the polarizing element is interposed between the polyvinyl alcohol films as the protective films having surfaces subjected to an easy-adhesion treatment. Other adhesives or PSA may be used when the adhesive property between the protective film and polarizing element is insufficient using the adhesive described above.

Figure 19:
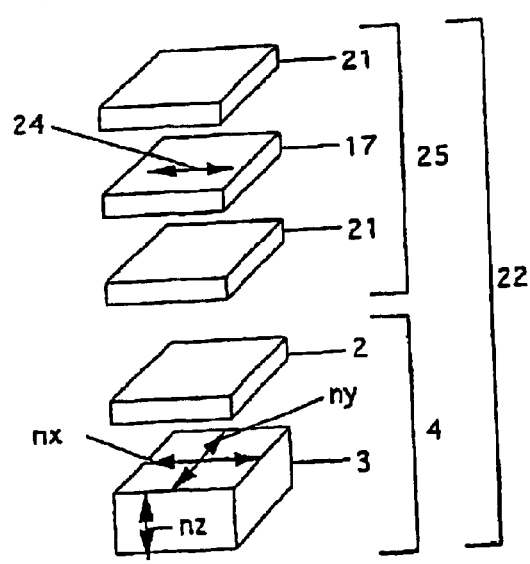
FIG. 19 shows a construction of the polarizing film according to the invention.
Figure 20:
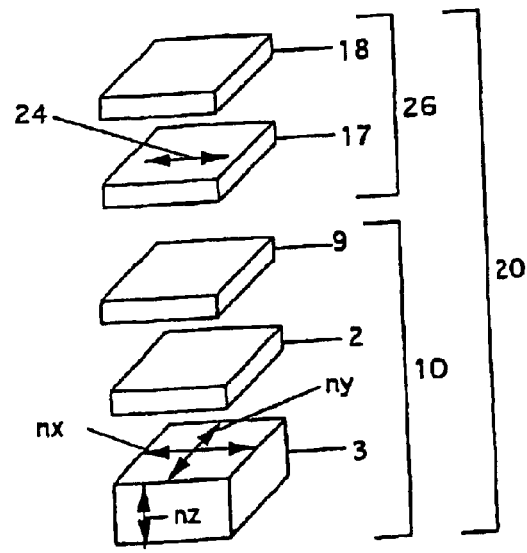
FIG. 20 shows another construction of the polarizing film according to the invention.
Figure 21:
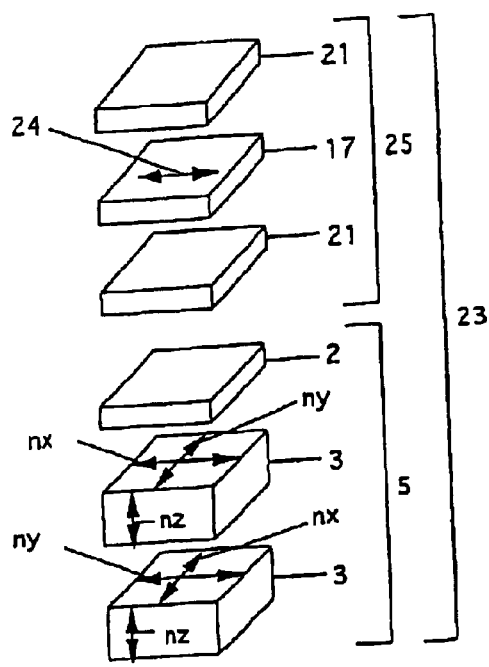
FIG. 21 shows a different construction of the polarizing film according to the invention.

The polarizing film of the invention is obtained by laminating the optical film, polarizing element and protective film. For example, as shown in FIG. 19, the polarizing film 22 of the invention as shown in FIG. 17 can be obtained by laminating the polarizing film 25 on the optical film 4 of the invention comprising the laminated first retardation film 2 and retardation film 3, wherein the polarizing element 17 is sandwiched between the third retardation films, or the triacetyl cellulose films 21 comprising surface layers treated with an alkali, in the polarizing film 25. In another example, the polarizing film 20 as shown in FIG. 16 can be obtained by laminating the first retardation film 2 on the second retardation film 3, followed by laminating the optical film 26 having the protective film 18 bonded only on one side of the polarizing element 17 on the optical film 10 of the invention having the laminated third retardation film 9 as shown in FIG. 20. Each retardation film and the polarizing element may be laminated using an adhesive or a PSA. As shown in FIGS. 19 and 20, the films are particularly laminated so that the direction of the absorption axis 24 of the polarizing element aligns with the $n_x$ direction of the second retardation film 3. Furthermore, the first, second and third retardation films are preferably laminated so that nx directions thereof are aligned with each other when $n_x$ and $n_y$ in each of the first retardation film 2 and the third retardation film are not equal with each other in FIGS. 19 and 20, while allowing the direction of the absorption axis 24 of the polarizing element to align with the $n_x$ direction of each film. As shown in FIG. 21, the polarizing film 23 of the invention as shown in FIG. 18 can be obtained by laminating two of the second retardation films 3, which are laminated so that the $n_x$ directions are perpendicular to each other, and the optical film 5 of the invention comprising the first retardation film 2 using the triacetyl cellulose films 21 having surface layers treated with an alkali as the third retardation films, and using the polarizing film 25 having the polarizing element 17 interposed between the third retardation films. However, it is preferable to laminate the polarizing element and the second retardation film so that the $n_x$ direction of the second retardation film 3 at the polarizing element 17 side aligns with the direction of the absorption axis 24 of the polarizing element 17 as shown in FIG. 21. Furthermore, it is more preferable to laminate the first, second and third retardation films so that the $n_x$ directions of the first retardation film 2 and third retardation film 21, and the $n_x$ direction of the second retardation film 3 at the polarizing element side are aligned with each other, and so that the $n_x$ directions of the first retardation film 2 and third retardation film 21, and the $n_x$ direction of the second retardation film 3 at the polarizing element side and the direction of the absorption axis 24 of the polarizing element are aligned with each other, when $n_x$ and $n_y$ of each of the first retardation film 2 and the third retardation film 21 are not equal with each other.

Figure 22:
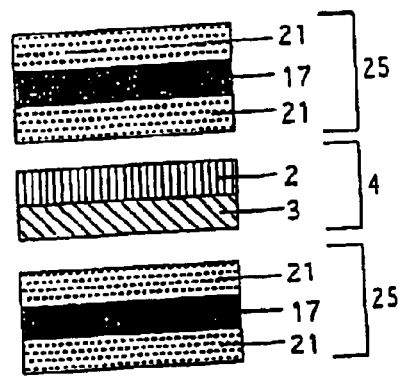
FIG. 22 shows an embodiment of the method for improving the view angle of the polarizing film according to the invention.
Figure 23:
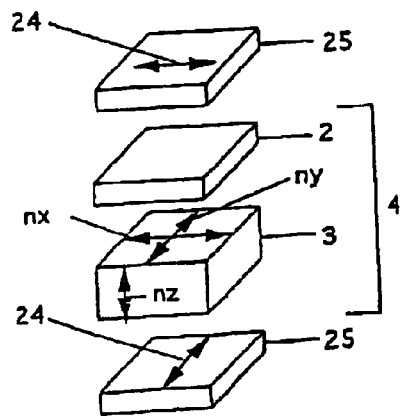
FIG. 23 shows a construction in the method for improving the view angle of the polarizing film according to the invention.
Figure 24:
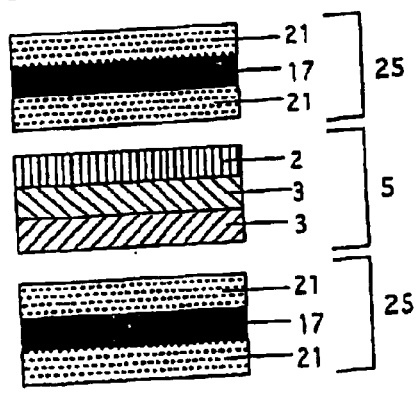
FIG. 24 shows a different embodiment of the method for improving the view angle of the polarizing film according to the invention.
Figure 25:
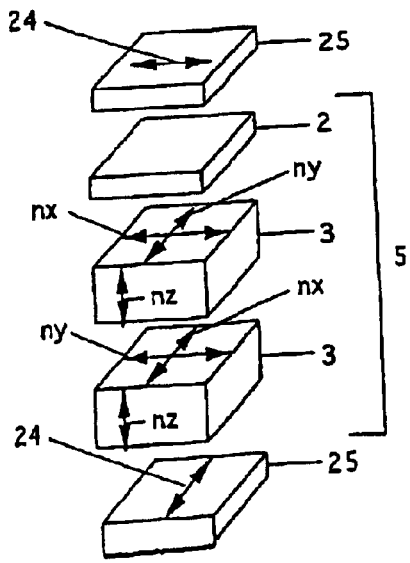
FIG. 25 shows another construction in the method for improving the view angle of the polarizing film according to the invention.
Figure 26:
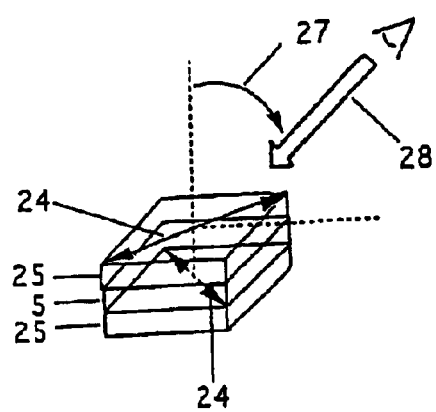
FIG. 26 is a drawing concerning the view angle dependency of the polarizing film.

The view angle dependency of the polarizing film can be improved using the optical film of the invention obtained as described above. This improvement may be achieved by disposing the optical film 4 of the invention between two of the polarizing films 25 having the polarizing element 17 sandwiched between the triacetyl cellulose films 21 having surface layers treated with an alkali as shown in FIG. 22. The triacetyl cellulose films also serve as the third retardation films disposed so that absorption axes thereof are perpendicular to each other. It is preferable to dispose the second retardation film 3 and the polarizing film 25 so that the $n_x$ direction of second retardation film 3 aligns with the direction of the absorption axis 24 of the polarizing film 25 at the first retardation film 2 side as shown in FIG. 23. In another example, the improvement is achieved by disposing the optical film 5 between two of the polarizing films 25 comprising the polarizing element 17 sandwiched between the triacetyl cellulose films 21 having the surfaces treated with an alkali as shown in FIG. 24, wherein the triacetyl cellulose films are also the third retardation films disposed so that the absorption axes thereof are perpendicular to each other. It is preferable to dispose the second retardation film 3 and the polarizing film 25 as shown in FIG. 25 so that the $n_x$ direction of the second retardation film 3 aligns with the direction of the absorption axis 24 of the polarizing film 25 disposed at the second retardation film side. The other polarizing film as one of the pair member of the polarizing films of the invention maybe constructed so that the polarizing element 17 is sandwiched between the triacetyl cellulose films 21 as the third retardation layers having surface layers treated with an alkali as shown in FIG. 24. The third retardation film located at the second retardation film side, which is used as the other polarizing film as one of the pair member of the polarizing films of the invention, is considered to be a part of the construction of the optical film of the invention. Accordingly, $d_n$ and $\Delta n_n$ of the film is preferably adjusted so that the absolute value $|\Delta n_n \cdot d_n|$ of $\Delta n_n \cdot d_n$ as a product of $\Delta n_n$ and dn is preferably 5 to 200 nm, more preferably 10 to 150 nm, and particularly 10 to 100 nm, when the mean in-plane refractive index $n_o$ determined by the equation (1) and the refractive index $n_e$ in the thickness direction determined by the equation (2) satisfy the relation $n_e - n_o < 0$, and the thickness of the film is represented by d and the difference of $n_e - n_o$ is represented by $\Delta n_n$. The values of $\Delta n_p \cdot d_p$ and $|\Delta n_n \cdot d_n|$ of each film may be adjusted so that the absolute value $|(\Sigma\Delta n_p \cdot d_p - \Sigma|\Delta n_n \cdot d_p|)|$ of the difference between the sum $\Sigma n_p \cdot d_p$ of $\Delta n_p \cdot d_p$ of each first retardation film sandwiched between the polarizing elements, and the sum $\Sigma|\Delta n_n \cdot d_n|$ of $|\Delta n_n \cdot d_n|$ of the third retardation film sandwiched between the polarizing elements, is 5 to 100 nm, preferably 5 to 70 nm. Disposing the films as described above permits leak of light occurring in the direction of observation 28 to be largely reduced, when the direction of observation is tilted from the front direction of the polarizing film to a direction different 27 from the direction of the absorption axis (for example 45° from the absorption axis) as shown in FIG. 26, thereby enabling the view angle dependency of the polarizing film to be improved.

Figure 27:
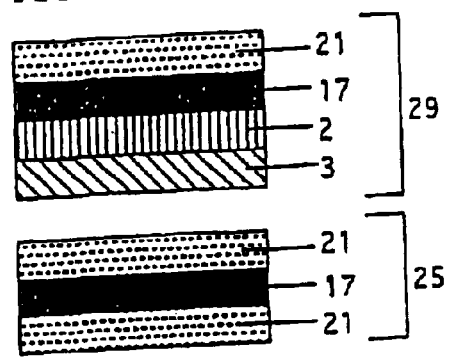
FIG. 27 shows a further different embodiment of the method for improving the view angle of the polarizing film according to the invention.
Figure 28:
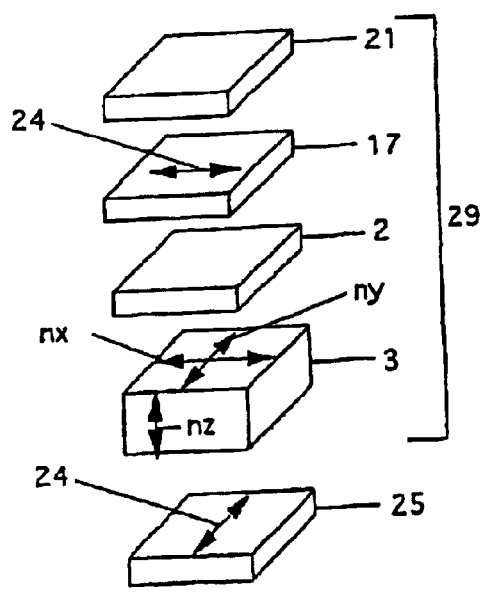
FIG. 28 shows a different construction in the method for improving the view angle of the polarizing film according to the invention.

The view angle dependency of the polarizing film can be also improved using the polarizing film of the invention. The view angle dependency of the polarizing film may be also improved by disposing another polarizing film 25 at the optical film side of the invention included in the polarizing film 29 as shown in FIG. 27. The polarizing film is preferably laminated so that the direction of the absorption axis 24 of the polarizing film 29 aligns with the $n_x$ direction of the second retardation film 3 included in the polarizing light 29 as shown in FIG. 28. The absorption axes of the polarizing film are perpendicular to each other.

Figure 29:
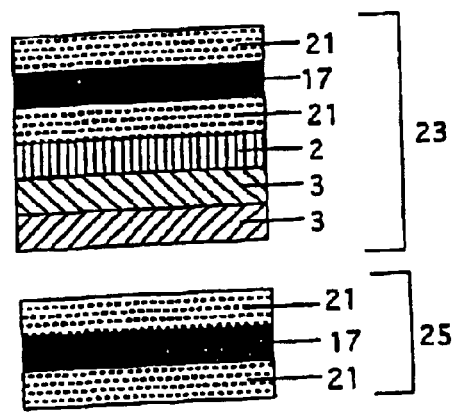
FIG. 29 shows a further different embodiment of the method for improving the view angle of the polarizing film according to the invention.
Figure 30:
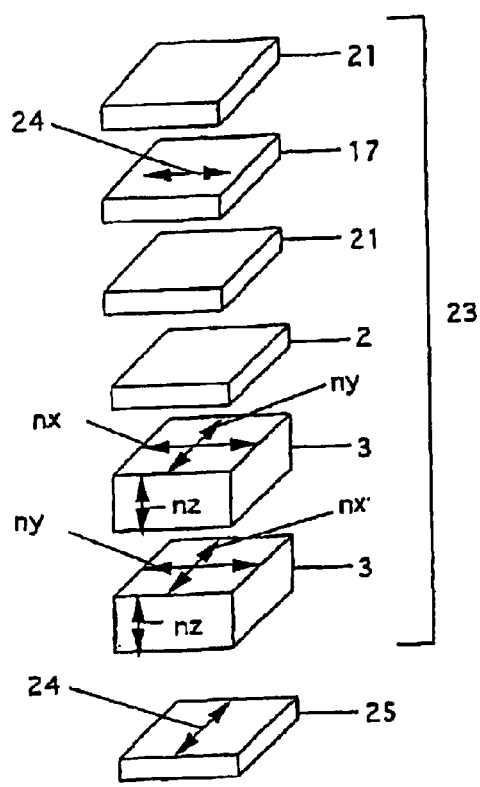
FIG. 30 shows a further different construction in the method for improving the view angle of the polarizing film according to the invention.

The view angle dependency may be also improved in another example by disposing the other polarizing film 25 at the optical film side included in the polarizing film 23 of the invention as shown in FIG. 29. It is also preferable to laminate the polarizing film and retardation film so that the direction of the absorption axis 24 of the polarizing film 23 of the invention aligns with the $n_x$ direction of the second retardation film 3 at the polarizing element side 17 included in the polarizing film 23 as shown in FIG. 30. The nx direction of the second retardation film 3 included in the polarizing film 23 of the invention located at the other polarizing film 25 side aligns with the absorption axis 24 of the other polarizing film 25. The directions 24 of the absorption axes of the polarizing films are also perpendicular to each other.

Figure 31:
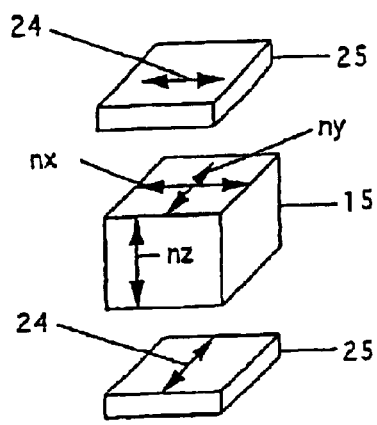
FIG. 31 shows a further different construction in the method for improving the view angle of the polarizing film according to the invention.
Figure 32:
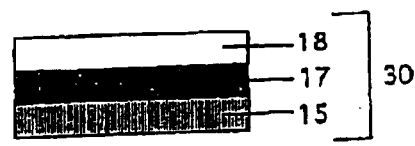
FIG. 32 shows a different construction of the polarizing film according to the invention.
Figure 33:
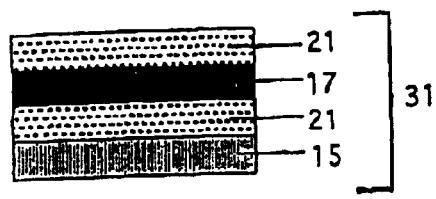
FIG. 33 shows a further different construction of the polarizing film according to the invention.

The view angle characteristics may be also improved using the fourth retardation film alone or using the optical film of the invention comprising the fourth retardation film laminated with the third retardation film. The effect as described above is attained, as shown in FIG. 31, by disposing the fourth retardation film 15 between two polarizing films 25 comprising a polarizing element 17, or the third retardation film, interposed between triacetyl cellulose films 21 having a surface treated with an alkali so that the absorption axes thereof are perpendicular to each other. The fourth retardation film 15 is preferably disposed so that the $n_x$ direction thereof aligns with the absorption axis direction 24 of one of the polarizing elements. The view angle characteristics of the polarizing film can be also improved by disposing polarizing films so that the directions of the absorption axes of the polarizing elements of these polarizing films are perpendicular to each other as shown in FIGS. 32 and 33, using the polarizing film 30 of the invention comprising the laminated fourth retardation film 15, polarizing element 17 and protective film 18 or the polarizing film 31 at one side, and another polarizing film comprising a polarizing element interposed between triacetyl cellulose film whose surface layer having been treated with an alkali on the other side. The polarizing film 31 comprises the retardation film 15 and a polarizing film having the polarizing element 17 interposed between the triacetyl cellulose films 21, or the third retardation film, having surface layers treated with an alkali.

Figure 34:
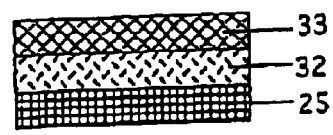
FIG. 34 shows an embodiment of the liquid crystal display device according to the invention in which the view angle characteristics are improved.
Figure 35:
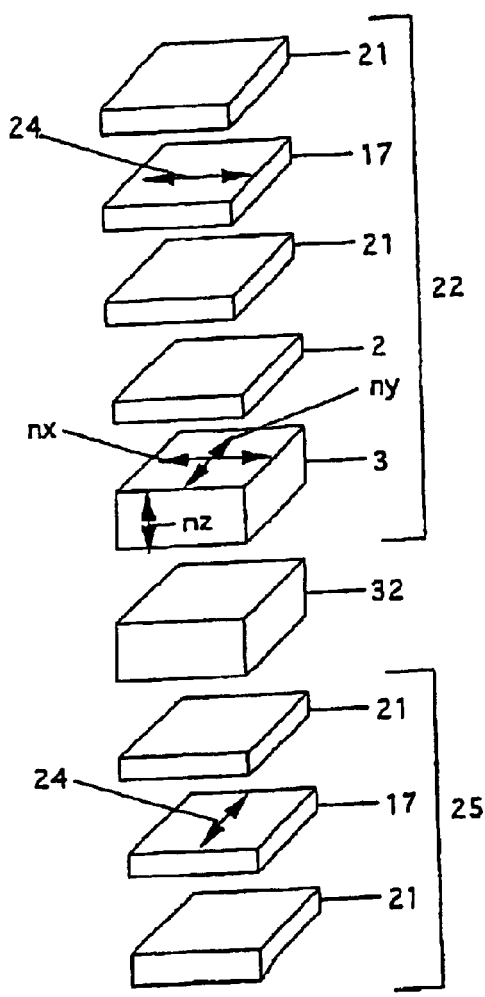
FIG. 35 shows a construction of the liquid crystal display device in which the view angle characteristics are improved.
Figure 36:
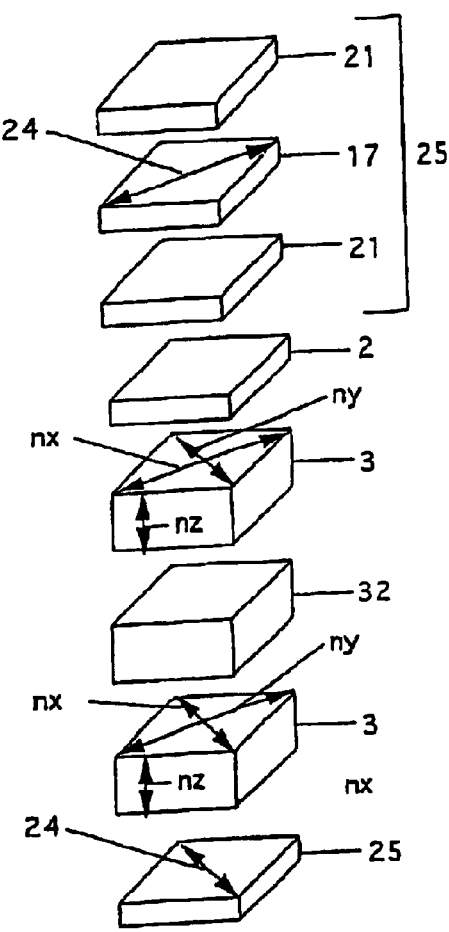
FIG. 36 shows another construction of the liquid crystal display device in which the view angle characteristics are improved.
Figure 37:
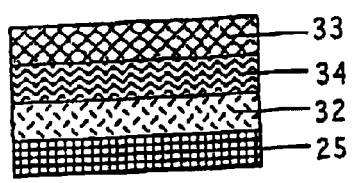
FIG. 37 shows another embodiment of the liquid crystal display device in which the view angle characteristics are improved.
Figure 38:
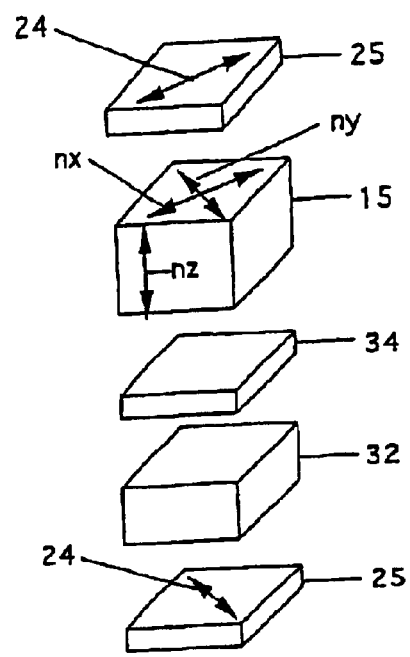
FIG. 38 shows a different construction of the liquid crystal display device in which the view angle characteristics are improved.
Figure 39:
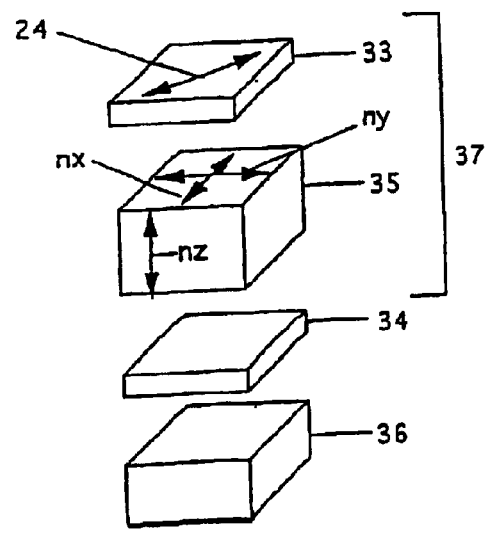
FIG. 39 shows a different construction of the liquid crystal display device in which the view angle characteristics are improved.

The view angle characteristics of the liquid crystal display device can be improved by using the optical film or polarizing film of the invention obtained as described above, or by using the liquid crystal display device in which the view angle dependency of the polarizing film has been improved. Such liquid crystal display may be obtained by disposing the polarizing film 33 at one side of the liquid crystal cell 32, and the polarizing film 25 comprising a polarizing element interposed between the triacetyl cellulose film whose surface layer having been treated with an alkali at the other side of the liquid crystal cell as shown in FIG. 34, so that the directions of the absorption axes 24 of the polarizing films are perpendicular to each other. The polarizing films and the liquid crystal cell may be bonded with a PSA. In a different example of the liquid crystal display device of the invention as shown in FIG. 35, the polarizing film 22 of the invention is disposed at one side of the liquid crystal cell 32, and the polarizing film 25 is disposed at the other aide of the liquid crystal cell so that the directions of the absorption axes of the polarizing films are perpendicular to each other. The polarizing film 25, or the third retardation film, comprises a polarizing element interposed between triacetyl cellulose film whose surface layer having been treated with an alkali. The view angle characteristics of the liquid crystal display device may be also improved by disposing the liquid crystal cell between arbitrary films from the polarizing element constituting the polarizing film of the invention through the second retardation film located at the polarizing film side. In such example shown in FIG. 36, the liquid crystal cell 32 is sandwiched between two of the second retardation films 3, and the second retardation films are laminated so that the nx directions of the second retardation films are aligned in the direction of the absorption axis 24 of the polarizing element positioned at each side. Such construction is preferable for simply and efficiently producing the polarizing film. In other word, the stretching direction is made to be equal to the direction of the absorption axis in the production process of the polarizing film. The $n_x$ directions of the second retardation film and fourth retardation film may be also made to be equal to the stretching direction in the uniaxial stretching process. Likewise, all the polarizing element and the first, second and third retardation films may be laminated by roll-to-roll process, when the $n_x$ directions of the first and third retardation films are aligned in the longitudinal direction, or when $n_x$ and $n_y$ thereof are equal with each other, provided that these films are continuously formed long films. The other polarizing element and the second retardation film may be also laminated by the roll-to-roll process. In a different example of the liquid crystal display device of the invention, a compensation film 34 is preferably disposed at least at one side, or at both sides if necessary, of the liquid crystal cell in order to improve the view angle dependency of the liquid crystal cell as shown in FIG. 37, when the liquid crystal cell 32 exhibits some view angle dependency. In addition, the polarizing film 33 of the invention is disposed at one side of the liquid crystal cell, and the polarizing film 25, comprising a polarizing element interposed between the triacetyl films having surface layers treated with an alkali, is disposed at the other side of the liquid crystal cell. Such arrangement permits the view angle characteristics of the liquid crystal cell as well as of the polarizing film to be simultaneously improved, thereby greatly improving the view angle characteristics as the liquid crystal display device. In a different example of the liquid crystal display device of the invention, the polarizing film 25 and fourth retardation film 15 are laminated so that the direction of the absorption axis 24 of the polarizing film aligns with the $n_x$ direction of the fourth retardation film as shown in FIG. 38. The fourth retardation film is disposed at the compensation film 34 side of the liquid crystal cell 32 having the film 34 for compensating the view angle dependency of the liquid crystal cell, and the polarizing film 25 is disposed at the opposite side of the liquid crystal cell 32 so that the directions of the absorption axes 24 of the polarizing films align with each other. In an example of the reflection liquid crystal display of the invention as shown in FIG. 39, the polarizing film 33 of the invention is laminated with the retardation film 35 so that the direction of the absorption axis 24 is about 45° to the nx direction of the retardation film, and the circular dichroism film 37 obtained is laminated on the liquid crystal cell 36 having a reflection layer or reflection film. It is also possible in this case to laminate the film 34 for compensating the liquid crystal cell between the circular dichroism film 37 and liquid crystal cell 36 as shown in FIG. 39. The retardation film to be used for the circularly polarizing film is preferably a so-called ¼ wavelength film that gives a retardation of 130 nm to 145 nm, more preferably 135 to 140 nm, against a light with a wavelength of 550 nm, and the film is more preferably gives a retardation of ¼ wavelength at a wavelength in the visible region. A preferable example of the film is the achromatic second retardation film, the optical film of the invention in which the achromatic second retardation film is laminated with the first retardation film, or the fourth retardation film. A laminated achromatic retardation film having a retardation of about ¼ wavelength may be also used, wherein the laminated achromatic retardation film is obtained by laminating a plurality of retardation films comprising a cycloolefin polymer such as norbornene derivatives and non-achromatic retardation films (preferably, the film has refractive indices with a relation of $n_x>n_y>n_y$, and orientations in the $n_x$, $n_y$ and $n_z$ directions are controlled so that the $N_z$ coefficient defined by the equation (3) is preferably 0.3 to 0.7, more preferably 0.4 to 0.6) comprising polycarbonate as shown in FIG. 2 by the method as described in Japanese Patent Publication No. 3174367, Proc. Indian Acad, Sci, A41, 130, 137 (1955), and SPIE Vol. 307, Polarizers and Aoolications, 120 (1981).

Examples of the liquid crystal cells to be used in the liquid crystal display device of the invention include a twisted nematic (TN), super-twisted nematic (STN), vertically aligned nematic (VA), in-plane switching (IPS), bend nematic (OCB), ferromagnetic (SSF), antiferromagnetic (AF) liquid crystal cells. The liquid crystal display device using these liquid crystal cells can be used as transmission, reflection and reflection semi-transmission liquid crystal displays. Only one or two polarizing films may be used for the reflection liquid crystal device, and the retardation of the retardation film is adjusted depending on the view angle characteristics of the retardation film in each case. Since view angle dependency by the liquid crystal cell itself is exhibited depending on the kind of the liquid crystal cell, a liquid crystal cell in which view angle dependency of the liquid crystal cell itself is compensated is preferably used. While various methods for compensating the liquid crystal cell's own view angle dependency have been used depending on the constructions of the liquid crystal cells, a compensation method using a film having a discotheque liquid crystal layer with hybrid alignment has been used for the TN liquid crystal cell. In the method known in the art, the VA liquid crystal is compensated using a film biaxially stretched so that the relation of $n_e-n_o<0$ is satisfied, or using a film having a homeotropically aligned discotheque liquid crystal layer. The view angle dependency as the liquid crystal display device may be further improved by using the liquid crystal cell compensated by the method known in the art as described above, and by using the optical film of the invention or the polarizing film of the invention by the method according to the invention, as using the film 34 for compensating the view angle dependency of the liquid crystal cells shown in FIGS. 37, 38 and 39.

EXAMPLES

The invention will be described in more detail with reference to examples and comparative examples.

Example 1

A solution with a solid fraction concentration of 20% was prepared by dissolving a mixture of 23.5 parts by weight and 70.5 parts by weight of UV curable liquid crystalline compounds described in WO 97/44703 as shown in the chemical formulae (1) and (2), respectively, and 6 parts by weight of a photopolymerization initiator Irga-cure 907 (Ciba Specialty Chemicals Co.) in a mixed solvent of 300 parts by weight of toluene and 100 parts by weight of cyclohexanone.

(chemical formula 1)

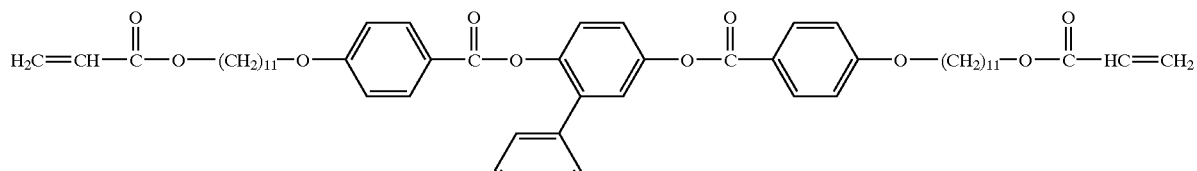

(chemical formula 2)

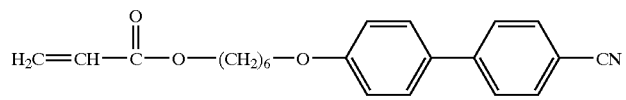

This solution was applied on the polarizing element side of an iodide based polarizing film made by Polatechno Co. (the content of borate in polyvinyl alcohol having a degree of polymerization of 1700 and a thickness of about 20 μm after stretching is 15%; the polyvinyl alcohol film is bonded to one face of a triacetyl cellulose film as a protective film having surface layers treated with an alkali using a polyvinyl alcohol adhesive) using a wire bar. A polarizing film having a first retardation film was obtained by UV polymerization using a high pressure mercury vapor lamp (80 w/cm) after removing the solvent by heating. The first retardation film has a thickness of 1 μm. The first retardation film was peeled from the polarizing element using a glass plate coated with a PSA for determining optical characteristics of the first retardation film, and changes of the retardation by tilting from the film surface were measured with an automatic birefringence meter (KOBRA-21ADH made by Oji Scientific Instruments). The results are shown in FIG. 40. FIG. 40 shows that the first retardation film is homeotropically aligned to the film plane. The Δnp·dp value was determined to be 39 nm from the changes of the retardation value by tilting when the mean in-plane refractive index is represented by $n_o$, the refractive index in the thickness direction is represented by $n_e$, and the thickness is represented by $d_p$ with a relation of $n_e - n_o = \Delta n_p$. Then, a polycarbonate film as a second retardation film was laminated on the surface of the first retardation film of the polarizing film with a PSA so that the $n_x$ direction aligns the direction of the absorption axis of the polarizing element, wherein the polycarbonate film had a refractive index $n_x$ of 1.5864 in the direction showing the maximum in-plane refractive index, a refractive index $n_y$ of 1.5844 in the direction perpendicular to the direction described just before, a refractive index $n_z$ of 1.5841 in the thickness direction, a thickness d of 70μ, and a $(n_x - n_y) \cdot d$ of 140 nm at 550 nm. Subsequently, a second retardation film comprising the same polycarbonate film was bonded on the surface of the bonded first retardation film using a PSA so that the $n_x$ direction is perpendicular to the direction of the absorption axis of the polarizing element, thereby obtaining the polarizing film of the invention. The polarizing film of the invention and the iodide based polarizing film made by Polatechno Co. were bonded with a PSA so that the absorption axes of the polarizing elements are perpendicular to each other. Both sides o the polarizing element of the iodide based polarizing film were sandwiched with triacetyl cellulose film whose surface layer having been treated with an alkali (a refractive index $n_x$ of 1.49522 in the direction showing the maximum in-plane refractive index, a refractive index $n_y$ of 1.49517 in the direction perpendicular to the direction described just before, a refractive index $n_z$ of 1.49461 in the thickness direction, a thickness d of 80μ, a mean in-plane refractive index no of 1.49520, and $|\Delta n_n \cdot dn|$ of 49 nm with a relation of $(n_e - n_o) = \Delta n_n$). The value of $|(\Delta n_p \cdot d_p - |\Delta n_n \cdot d_n|)|$ was 10 nm. The transmittance at 450, 550 or 650 nm in the front direction of each polarizing element of the polarizing films having perpendicular absorption axes (orthogonal transmittance), and the transmittance at 450, 550 or 650 nm in the direction inclined 50° to the 45° direction from the absorption axis of each polarizing element of the polarizing films (inclined orthogonal transmittance) were measured with a spectrophotometer (UV-3100 made by Shimadzu Co.). The results are shown in Table 1. The transmittance of each polarizing element in the wavelength range of 400 to 700 nm in the direction 50° inclined in the 45° direction from the absorption axis (inclined orthogonal transmittance) was also measured with a spectrophotometer (UV-3100 made by Shimadzu Co.). The results are shown in FIG. 45.

Example 2

The polarizing film of the invention was obtained by the same method as in Example 1, except that one sheet of the second retardation film, or a polycarbonate film, was laminated on the surface of the first retardation film of the polarizing film (Δnp·dp=39 nm) used in Example 1 with a PSA so that the $n_x$ direction aligns with the direction of the absorption axis of the polarizing element. The second retardation film had a refractive index $n_x$ of 1.5864 in the direction showing the maximum in-plane refractive index, a refractive index $n_y$ of 1.5844 in the direction perpendicular to the direction described just before, a refractive index $n_z$ of 1.5841 in the thickness direction, a thickness d of 70μm, and the value of $(n_x - n_y) \cdot d$ of 140 nm at 550 nm. This polarizing film was bonded to the iodide based polarizing film (made by Polatechno Co.) used in Example 1 with a PSA so that the absorption axes of the polarizing elements are perpendicular to each other. The polarizing film comprises a polarizing element sandwiched between triacetyl cellulose films treated with an alkali. The polarizing film obtained was evaluated by the same method as in Example 1. The results are shown in FIG. 45.

Example 3

The first retardation film ($\Delta n_p \cdot d_p = 65$ nm) prepared by the same procedure as in Example 1 was bonded to the third retardation film, or a triacetyl cellulose film having a sticky layer on one surface and surface layers thereof are treated with an alkali, and the first retardation film was peeled off from the polarizing element. The triacetyl cellulose film had a refractive index $n_x$ of 1.49522 in the direction showing the maximum in-plane refractive index, a refractive index $n_y$ of 1.49517 in the direction perpendicular to the direction described just before, a refractive index $n_z$ ($n_e$) of 1.49461 in the thickness direction, a thickness $d_n$ of 80 μm, a mean in-plane refractive index $n_o$ of 1.49520, and $|\Delta n_n \cdot dn_n|$ of 49 nm with a relation of $n_e - n_o = \Delta nn$. Then, the second retardation film, or a polycarbonate film having $(n_x - n_y) \cdot d$ of 140 nm at 550 nm used in Example 1, was laminated on the first retardation film side of a laminate of the peeled third retardation film and the second retardation film with a PSA so that the $n_x$ direction of the second retardation film aligns with the $n_x$ direction of the third retardation film. The optical film of the invention was obtained by bonding the second retardation film, or the same polycarbonate film as described above, on the previously bonded second retardation film side with a PSA so that the $n_x$ directions of the second retardation films are perpendicular to each other. Subsequently, the polarizing film of the invention was obtained by bonding the polarizing element side of the iodide based polarizing film, which was bonded with a triacetyl cellulose film having an alkali treated surface layer on one side, to the alkali treated surface layer of the triacetyl cellulose film of the optical film of the invention with a polyvinyl alcohol adhesive so that the direction of the absorption axis of the polarizing element aligns with the $n_x$ direction of the second retardation film located at the polarizing element side of the optical film. This polarizing film was bonded to the iodide based polarizing film (made by Polatecho Co.) with a PSA so that the absorption axes of the polarizing films are perpendicular to each other. The iodide based polarizing film had the polarizing element used in Example 1 which was sandwiched between triacetyl cellulose film whose surface layer having been treated with an alkali (the triacetyl cellulose film had a refractive index $n_x$ of 1.49522 in the direction showing the maximum in-plane refractive index, a refractive index $n_y$ of 1.49517 in the direction perpendicular to the direction described just before, a refractive index $n_z$ ($n_e$) of 1.49461 in the thickness direction, a thickness $d_n$ of 80 μm, a mean in-plane refractive index $n_o$ of 1.49520, and $|\Delta n_n \cdot dn_n|$ of 49 nm with a relation of $n_e - n_o = \Delta n_n$). The absolute value of the difference between $\Delta n_p \cdot dp$ of one sheet of the first retardation film located between the polarizing elements and the sum of $|\Delta n_n \cdot dn_n|$ of two of the third retardation film was 33 nm. The polarizing film was evaluated as in Example 1. The results are shown in Table 1 and FIG. 45.

Example 4

A solution with a solid fraction concentration of 20% was prepared by dissolving a mixture of 39.2 parts by weight, 45.0 parts by weight and 9.8 parts by weight of UV curable liquid crystalline compounds described in WO 98/00475 as shown in the chemical formulae (3), (4) and (5), respectively, and 6 parts by weight of a photopolymerization initiator Irga-cure 907 (Ciba Specialty Chemicals Co.) in a mixed solvent of 300 parts by weight of toluene and 100 parts by weight of cyclohexanone.

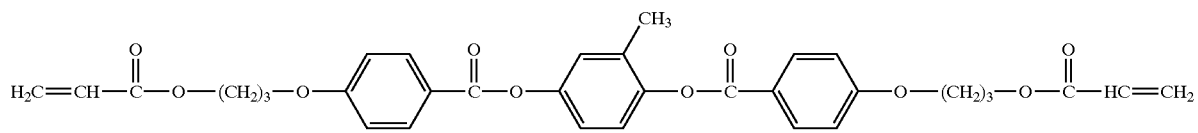
(chemical formula 3)

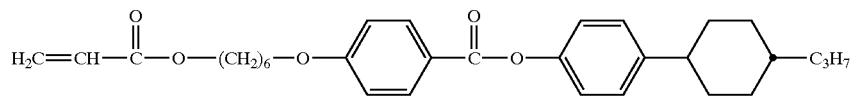
(chemical formula 4)

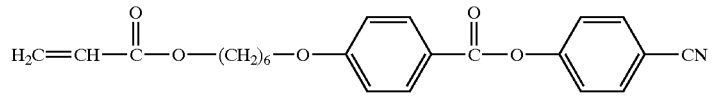
(chemical formula 5)

The first retardation film was produced using the solution by the same procedure as in Example 1. The first retardation film had a thickness of 1.3 μm. The first retardation film was peeled from the polarizing element using a glass plate coated with a PSA for investigating the optical characteristics of the first retardation film, finding that the first retardation film is homeotropically aligned to the film surface. It was also found from the retardation changes by inclination that $\Delta np \cdot dp$ is 35 nm with a relation of $n_e - n_o = \Delta n_p$ when the mean in-plane refractive index is represented by $n_o$, the refractive index in the thickness direction is represented by $n_e$ and the thickness is represented by $d_p$. The first retardation film was transferred onto a iodide based polarizing film (made by Polatechno Co.) used in Example 1 using a PSA, followed by bonding one sheet of the second retardation film, or a polycarbonate film having $(n_x - n_y) \cdot d$ of 140 nm at 550 nm used in Example 1, using a PSA so that the $n_x$ direction thereof aligns the direction of the absorption axis of the polarizing element, there by obtaining the polarizing film of the invention. The iodide based polarizing film comprises a polarizing element sandwiched between triacetyl cellulose film whose surface layer having been treated with an alkali (a refractive index $n_x$ of 1.49522 in the direction showing the maximum in-plane refractive index, a refractive index $n_y$ of 1.49517 in the direction perpendicular to the direction described just before, a refractive index $n_z$ ($n_e$) of 1.49461 in the thickness direction, a thickness $d_n$ of 80 μm, a mean in-plane refractive index $n_o$ of 1.49520, and $|\Delta n_n \cdot dn_n|$ of 49 nm with a relation of $n_e - n_o = \Delta n_n$). This polarizing film was bonded to the iodide based polarizing film (made by Polatechno Co.) used in Example 1 with a PSA so that the absorbing aces of the polarizing elements are perpendicular to each other. The iodide based polarizing film comprises a polarizing element sandwiched between triacetyl cellulose film whose surface layer having been treated with an alkali (a refractive index $n_x$ of 1.49522 in the direction showing the maximum in-plane refractive index, a refractive index $n_y$ of 1.49517 in the direction perpendicular to the direction described just before, a refractive index $n_z$ ($n_e$) of 1.49461 in the thickness direction, a thickness $d_n$ of 80 μm, a mean in-plane refractive index $n_o$ of 1.49520, and $|\Delta n_n \cdot dn_n|$ of 49 nm with a relation of $n_e - n_o = \Delta n_n$). The absolute value of the difference between $\Delta n_p \cdot dp$ of one sheet of the first retardation film located between the polarizing elements and the sum of $|\Delta n_n \cdot dn_n|$ of two of the third retardation film was 63 nm. This film was evaluated as in Example 1, and the results are shown in Table 1 and FIG. 45. Then, the liquid crystal display device of the invention was obtained by bonding the polarizing films as described above on a commercially available vertical alignment nematic liquid crystal cell so as to form the construction in FIG. 41 (in the construction the absorption axis of each polarizing film is disposed so as to be perpendicular). Subsequently, the liquid crystal display device was placed on a planar white light source, and the distribution of luminance in all the directions at an angle of 80° was measured using a view angle meter (EZ contrast 160R made by ELDIM Corp.). The mean value of the view angle having the same luminance as the central with of luminance (2 cd/cm² or less) in the region in the 45° direction from the absorption axis of the polarizing element, and the maximum luminance in all the directions are shown in Table 1.

Example 5

A solution with a solid fraction concentration of 20% was prepared by dissolving a mixture of 23.5 parts by weight and 70.5 parts by weight of UV curable liquid crystalline compounds described in WO 97/44703 as shown in the chemical formulae (6) and (7), respectively, and 6 parts by weight of a photopolymerization initiator Irga-cure 907 (Ciba Specialty Chemicals Co.) in a mixed solvent of 300 parts by weight of toluene and 100 parts by weight of cyclohexanone.

(chemical formula 6)

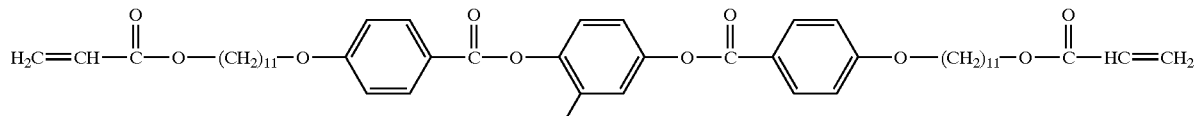

(chemical formula 7)

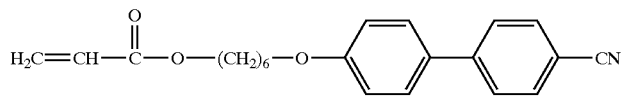

Figure 42:
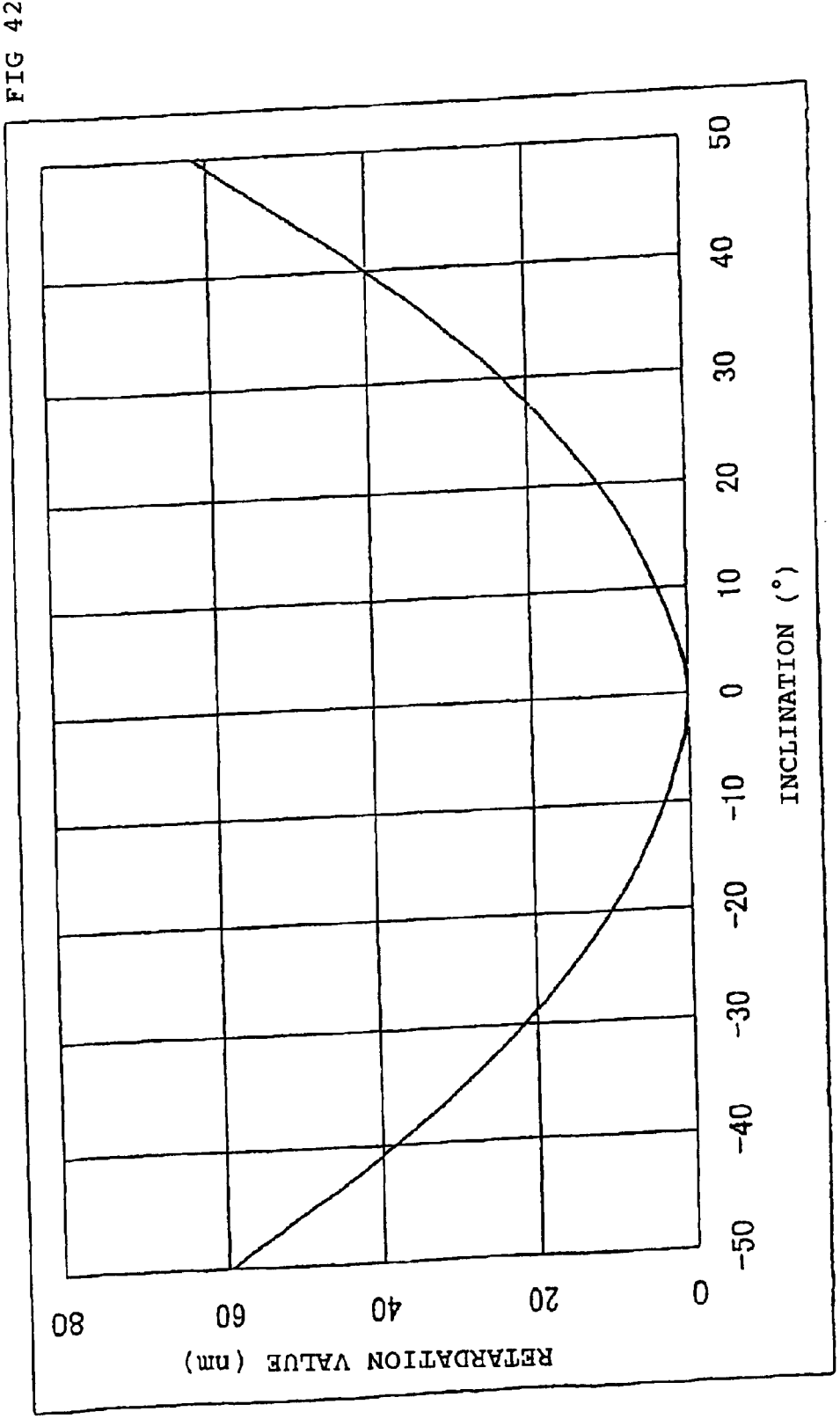
FIG. 42 is a graph showing the change of the retardation value against the inclination of the first retardation film described in Example 5 used in the invention.
Figure 43:
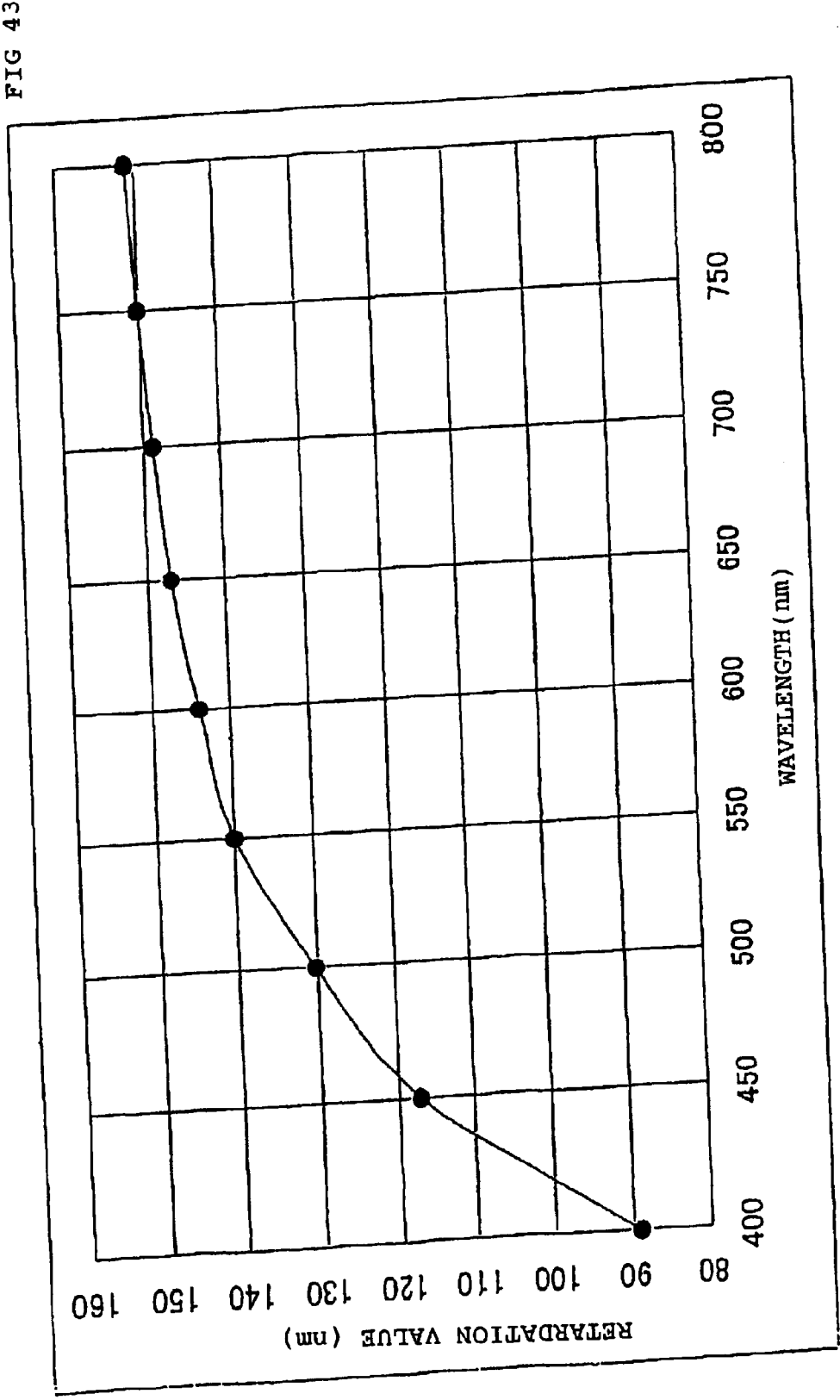
FIG. 43 is a graph showing the change of retardation value of the second retardation film to be used in Example 5 depending on the wavelength.

This solution was coated on the surface of the polarizing element of the iodide based polarizing film made by Polatechno Co. (the content of boric acid of about 15% in polyvinyl alcohol with a degree of polymerization of 1700 and a thickness of about 20 μm after stretching; a triacetyl cellulose film having surface layers treated with an alkali was bonded on one surface as a protective film with a polyvinyl alcohol adhesive) using a wire bar. The polarizing film comprising the first retardation film was obtained by polymerizing the liquid crystalline compounds by irradiating with a high pressure mercury vapor lamp (80 W/cm) after removing the solvent by heating. The first retardation film had a thickness of 1.3 μm. The first retardation film was peeled from the polarizing element using a glass plate coated with a PSA for investigating the optical characteristics of the first retardation film, and changes of the retardation of the retardation film tiled from the film surface were measured with an automatic birefringence meter (KOBRA-21ADH made by Ohji Instruments Co.). The results are shown in FIG. 42. FIG. 42 shows that the first retardation film is homeotropically aligned to the film surface. The $\Delta n_p \cdot d_p$ value as determined from the changes of the retardation by inclination was 65 nm when the in-plane refractive index is represented by $n_o$, the refractive index in the thickness direction is represented by $n_e$ and the thickness is represented by $d_p$ with a relation of $n_e - n_o = \Delta n_p$. The polarizing film of the invention was obtained by laminating the achromatic second retardation film as shown in FIG. 43 using a PSA so that the $n_x$ direction of the second retardation film aligns with the direction of the absorption axis of the polarizing element (the wavelength dependency of the retardation was calculated by a Cauchy equation using measured value with an automatic birefringence meter KOBRA-21ADH made by Ohji instrument Co., and). The achromatic second retardation film had a in-plane refractive index $n_x$ of 1.6286 in the direction showing the maximum refractive index, a refractive index $n_y$ of 1.6272 in the direction perpendicular to the direction described just before, a refractive index $n_z$ of 1.6268 in the thickness direction (each refractive index was measured using an Abbe refractometer), a thickness d of 100 μm, and $(n_x - n_y) \cdot d$ of 140 nm at 550 nm. This polarizing film of the invention was bonded to the iodide based polarizing film (made by Polatechno Co.) with a PSA so that the absorption axes of the polarizing elements are perpendicular to each other. The iodide based polarizing film comprises a polarizing element sandwiched between triacetyl cellulose film whose surface layer having been treated with an alkali (a refractive index $n_x$ of 1.49522 in the direction showing the maximum in-plane refractive index, a refractive index $n_y$ of 1.49517 in the direction perpendicular to the direction described just before, a refractive index $n_z$ ($n_e$) of 1.49461 in the thickness direction, a thickness $d_n$ of 80 μm, a mean in-plane refractive index $n_o$ of 1.49520, and $|\Delta n_n \cdot dn_n|$ of 49 nm with a relation of $n_e - n_o = \Delta n_n$). The value of $|(\Delta n_p \cdot dn_p - |\Delta n_n \cdot dn_n|)|$ was 16 nm. This polarizing film was evaluated as in Example 1. The results are shown in Table 1 and FIG. 45.

Example 6

The polarizing film of the invention was produced by bonding additional one sheet of the second retardation film used in Example 5 on the second retardation film of the same polarizing film of the invention as that in Example 5 except that the $\Delta n_p \cdot dn_p$ is 80 nm with a PSA so that the $n_x$ direction of the second retardation plates are perpendicular to each other. The polarizing film was evaluated as in Example 1. The results are shown in Table 1 and FIG. 45.

Example 7

A solution with a solid fraction concentration of 20% was prepared by dissolving a mixture of 39.2 parts by weight, 45.0 parts by weight and 9.8 parts by weight of UV curable liquid crystalline compounds described in WO 97/44703 as shown in the chemical formulae (8), (9) and (10), respectively, and 6 parts by weight of a photopolymerization initiator Irga-cure 907 (Ciba Specialty Chemicals Co.) in a mixed solvent of 300 parts by weight of toluene and 100 parts by weight of cyclohexanone.

(chemical formula 8)

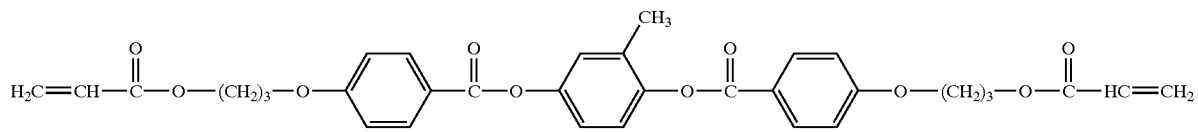

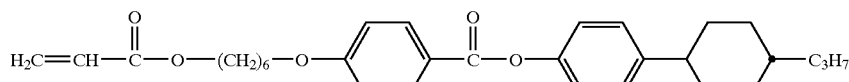

(chemical formula 9)

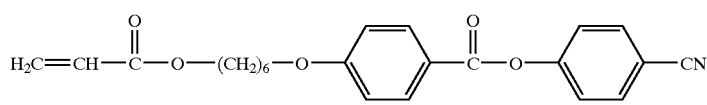

(chemical formula 10)

This solution was applied on the film surface of a PET film having a layer of a copolymerized acrylic polymer comprising n-butyl methacrylate, n-butyl acrylate, methyl methacrylate and 2-hydroxyethyl acrylate cross-linked with toluene diisocyanate using micro-photogravure coater. The first retardation film was prepared by polymerizing the liquid crystalline compounds by irradiating with a high pressure mercury vapor lamp (120 W/cm) after removing the solvents by heating. The thickness of the first retardation film was 0.8 $\mu$m. The first retardation film was peeled from the PET film having the cross-linked acrylic polymer layer using a glass plate coated with a PSA for investigating the optical characteristics of the first retardation film. The same measurement as in Example 1 showed that the first retardation film is homeotropically aligned to the film surface. The $\Delta n_p \cdot d_p$ value as determined from the changes of the retardation by inclination was 34 nm when the in-plane refractive index is represented by $n_o$, the refractive index in the thickness direction is represented by $n_e$ and the thickness is represented by $d_p$ with a relation of $n_e - n_o = \Delta n_p$. Then, this first retardation film was transferred onto the iodine based polarizing film made by Polatechno Co. used in Example 1 using a PSA. The iodide based polarizing film comprises a polarizing element sandwiched between triacetyl cellulose film whose surface layer having been treated with an alkali (a refractive index $n_x$ of 1.49522 in the direction showing the maximum in-plane refractive index, a refractive index $n_y$ of 1.49517 in the direction perpendicular to the direction described just before, a refractive index $n_z$ ($n_e$) of 1.49461 in the thickness direction, a thickness $d_n$ of 80 $\mu$m, a mean in-plane refractive index $n_o$ of 1.49520, and $|\Delta n_n \cdot dn_n|$ of 49 nm with a relation of $n_e - n_o = \Delta n_n$). The polarizing film of the invention was obtained by laminating the achromatic second retardation film used in Example 5 using a PSA so that the $n_x$ direction thereof aligns with the direction of the absorption axis of the polarizing element (the wavelength dependency of the retardation was calculated by the Cauchy equation from the measured value using an automatic birefringence meter KOBRA-21ADH made by Ohji Instrument Co.) The polarizing film of the invention was bonded to the iodide based polarizing film made by Polatechno Co. using a PSA so that the absorption axes of the polarizing elements are perpendicular to each other. The iodide based polarizing film comprises a polarizing element sandwiched between triacetyl cellulose film whose surface layer having been treated with an alkali (a refractive index $n_x$ of 1.49522 in the direction showing the maximum in-plane refractive index, a refractive index $n_y$ of 1.49517 in the direction perpendicular to the direction described just before, a refractive index $n_z$ ($n_e$) of 1.49461 in the thickness direction, a thickness $d_n$ of 80 $\mu$m, a mean in-plane refractive index $n_o$ of 1.49520, and $|\Delta n_n \cdot dn_n|$ of 49 nm with a relation of $n_e - n_o = \Delta n_n$). The absolute value of the difference between $\Delta n_p \cdot dp$ of one sheet of the first retardation film located between the polarizing elements and the sum of $|\Delta n_n \cdot dn_n|$ of two of the third retardation film was 63 nm. This polarizing film was evaluated as in Example 1. The results are shown in table 1 and FIG. 45.

COMPARATIVE EXAMPLE

Comparative Example 1

Two iodide based polarizing films made by Polatechno Co. having a polarizing element sandwiched between triacetyl cellulose films comprising surface layers treated with an alkali used in Examples 1 and 2 were bonded using a PSA so that the absorption axes of the polarizing elements are perpendicular to each other. This polarizing element was evaluated as in Example 1. The results are shown in Table 1 and FIG. 45.

Comparative Example 2

Two iodide based polarizing films made by Polatechno Co. having a polarizing element comprising a triacetyl cellulose film having a surface layer treated with an alkali on one face of the element were bonded using a PSA so that the absorption axes of the polarizing elements are perpendicular to each other and so that the surfaces of the polarizing elements faces with each other. This polarizing element was evaluated as in Example 1. The results are shown in Table 1 and FIG. 45.

Comparative Example 3

A liquid crystal cell was prepared by bonding a polarizing film on a commercially available nematic liquid crystal cell to form the construction in FIG. 44 (the polarizing films are disposed so that their absorption axes are perpendicular to each other) by the same procedure as in Example 4, except that the polarizing film used in Comparative example 1 was used. This liquid crystal display was evaluated as in Example 4. The results are shown in Table 1.

TABLE 1

| | Orthogonal transmittance in front direction (%) | Orthogonal transmittance at an inclination of 50° in 45° direction from absorbing axis (%) | Mean value of view angle having the same luminance as central luminance width in 45° direction from absorbing axis (°) | Maximum luminance in all direction (cd/cm²) |
|---|---|---|---|---|
| Example 1 | 0.01 (450 nm)<br>0.01 (550 nm)<br>0.01 (650 nm) | 0.36 (450 nm)<br>0.02 (550 nm)<br>0.08 (650 nm) | — | — |

TABLE 1-continued

| | Orthogonal transmittance in front direction (%) | Orthogonal transmittance at an inclination of 50° in 45° direction from absorbing axis (%) | Mean value of view angle having the same luminance as central luminance width in 45° direction from absorbing axis (°) | Maximum luminance in all direction (cd/cm²) |
|---|---|---|---|---|
| Example 2 | 0.01 (450 nm) | 1.10 (450 nm) | — | — |
| | 0.01 (550 nm) | 0.31 (550 nm) | | |
| | 0.01 (650 nm) | 0.12 (650 nm) | | |
| Example 3 | 0.01 (450 nm) | 0.28 (450 nm) | — | — |
| | 0.01 (550 nm) | 0.04 (550 nm) | | |
| | 0.01 (650 nm) | 0.18 (650 nm) | | |
| Example 4 | 0.01 (450 nm) | 0.27 (450 nm) | 80 | 2.0 |
| | 0.01 (550 nm) | 0.19 (550 nm) | | |
| | 0.01 (650 nm) | 0.61 (650 nm) | | |
| Example 5 | 0.01 (450 nm) | 0.34 (450 nm) | — | — |
| | 0.01 (550 nm) | 0.29 (550 nm) | | |
| | 0.01 (650 nm) | 0.20 (650 nm) | | |
| Example 6 | 0.01 (450 nm) | 0.31 (450 nm) | — | — |
| | 0.01 (550 nm) | 0.08 (550 nm) | | |
| | 0.01 (650 nm) | 0.08 (650 nm) | | |
| Example 7 | 0.01 (450 nm) | 0.09 (450 nm) | — | — |
| | 0.01 (550 nm) | 0.09 (550 nm) | | |
| | 0.01 (650 nm) | 0.14 (650 nm) | | |
| Comparative Example 1 | 0.01 (450 nm) | 1.08 (450 nm) | — | — |
| | 0.01 (550 nm) | 1.35 (550 nm) | | |
| | 0.01 (650 nm) | 1.47 (650 nm) | | |
| Comparative Example 2 | 0.01 (450 nm) | 0.60 (450 nm) | — | — |
| | 0.01 (550 nm) | 0.70 (550 nm) | | |
| | 0.01 (650 nm) | 0.76 (650 nm) | | |
| Comparative Example 3 | 0.01 (450 nm) | 1.08 (450 nm) | 40 | 4.1 |
| | 0.01 (550 nm) | 1.35 (550 nm) | | |
| | 0.01 (650 nm) | 1.47 (650 nm) | | |

The results in the examples and comparative examples show that leak of light when the observation point is inclined from the front direction to a direction different from the direction of absorption axis of the polarizing element is suppressed by using the polarizing film of the invention, showing that the view angle dependency of the polarizing film is improved. It is also evident from a comparison of Examples 1 and 2 that the wave length dependency of the view angle improving effect is reduced by using two of the second retardation film, also indicating that the view angle dependency is improved in a wider wavelength region. Examples 5, 6 and 7 further show that the wave length dependency of the view angle improving effect is reduced by using the achromatic retardation film, also indicating that the view angle dependency is improved in a wider wavelength region. Furthermore, a comparison of Example 4 and Comparative example 3 shows that the liquid crystal device of the invention has wider view angle characteristics as compared with comparative examples.

INDUSTRIAL APPLICABILITY

The view angle dependency of the polarizing film can be improved by the method of the invention using the polarizing film having the optical film prepared by laminating at least one of the first retardation film having a mean in-plane refractive index of $n_o$ and a refractive index of $n_e$ in the thickness direction wherein $n_e - n_o > 0$, and at least one of the second retardation film having a mean in-plane refractive index of $n_x$ in the direction showing the maximum refractive index, a refractive index of $n_y$ in the direction perpendicular to the direction described just before, and a refractive index of $n_z$ in the thickness direction wherein $n_x > n_y \geq n_z$. The liquid crystal display device using the optical film and polarizing film of the invention is also possible to improve the view angle characteristics of the liquid crystal display device by the method according to the invention.

What is claimed is:

1. An optical film prepared by laminating at least a first retardation film having a mean in-plane refractive index of $n_o$ and a refractive index of $n_e$ in the thickness direction, wherein $n_e - n_o > 0$ and $\Delta n_p \cdot d_p = 10$ to 100 nm when $n_e - n_O = \Delta np$ and thickness is dp, and at least an achromatic second retardation film having a maximum in-plane refractive index of $n_x$, a refractive index of $n_y$ in the direction perpendicular to the direction described just before, and a refractive index of $n_z$ in the thickness direction, wherein $n_x > n_y \geq n_z$, and $\Delta n \cdot d = 120$ to 150 nm when $n_x - n_y = \Delta n$ and thickness is d.

2. An optical film according to claim 1 prepared by laminating at least a third retardation film having a mean in-plane refractive index of $n_o$ and a refractive index in the thickness direction, wherein $n_e - n_o < 0$ and $|\Delta n_n \cdot d_n| = 10$ to 100 nm when $n_e - n_o = \Delta n_n$ and thickness is $d_n$.

3. The optical film according to claim 2, wherein the absolute value of the difference between the sum of $\Delta n_p \cdot d_p$ of the first retardation film and the sum of $\Delta n_n \cdot d_n$ of the third retardation film is 5 to 80 nm.

4. The optical film prepared by laminating an optical film according to claim 1 and a polarizing element so that the $n_x$ direction of the achromatic second retardation film of the optical film coincides with the direction of the absorption axis of the polarizing element.

5. A polarizing film prepared by laminating an optical film according to claim 2, and a polarizing element so that the $n_x$ direction of the achromatic second retardation film of the optical film coincides with the direction of the absorption axis of the polarizing element.

6. A polarizing film prepared by laminating an optical film according to claim 3, and a polarizing element so that the $n_x$ direction of the achromatic second retardation film of the optical film coincides with the direction of the absorption axis of the polarizing element.

7. A method for improving the view angle of a polarizing element, wherein the optical film according to claim 1 is sandwiched between two polarizing elements disposed so that their absorption axes are perpendicular to each other.

8. A method for improving the view angle of a polarizing element, wherein the optical film according to claim 2 is sandwiched between two polarizing elements disposed so that their absorption axes are perpendicular to each other.

9. A method for improving the view angle of a polarizing element, wherein the optical film according to claim 3 is sandwiched between two polarizing elements disposed so that their absorption axes are perpendicular to each other.

10. The method for improving the view angle of a polarizing element according to claim 7, wherein any one of said polarizing elements is the polarizing film according to claim 5.

11. The method for improving the view angle of a polarizing element according to claim 7, wherein any one of said polarizing elements is the polarizing film according to claim 5.

12. The method for improving the view angle of a polarizing element according to claim 7, wherein any one of said polarizing elements is the polarizing film according to claim 6.

13. The method for improving the view angle of a polarizing element according to claim 8, wherein any one of said polarizing elements is the polarizing film according to claim 4.

14. The method for improving the view angle of a polarizing element according to claim 8, wherein any one of said polarizing elements is the polarizing film according to claim 5.

15. The method for improving the view angle of a polarizing element according to claim 8, wherein any one of said polarizing elements is the polarizing film according to claim 6.

16. The method for improving the view angle of a polarizing element according to claim 9, wherein any one of said polarizing elements is the polarizing film according to claim 4.

17. The method for improving the view angle of a polarizing element according to claim 9, wherein any one of said polarizing elements is the polarizing film according to claim 5.

18. The method for improving the view angle of a polarizing element according to claim 9, wherein any one of said polarizing elements is the polarizing film according to claim 6.

19. A liquid crystal display device comprising the optical film or the polarizing film according to any one of claims 1, 2 or 3.

20. A liquid crystal display device comprising the optical film or the polarizing film according to claim 4.

21. A liquid crystal display device comprising the optical film or the polarizing film according to claim 5.

22. A liquid crystal display device comprising the optical film or the polarizing film according to claim 6.

* * * * *